(12) United States Patent
Li et al.

(10) Patent No.: US 9,020,829 B2
(45) Date of Patent: Apr. 28, 2015

(54) QUALITY OF SERVICE AWARE SCHEDULING FOR COMPOSITE WEB SERVICE WORKFLOWS

(75) Inventors: Wen-Syan Li, Fremont, CA (US); Thomas Phan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 12/116,812

(22) Filed: May 7, 2008

(65) Prior Publication Data

US 2009/0281818 A1 Nov. 12, 2009

(51) Int. Cl.
| G06Q 10/00 | (2012.01) |
| G06Q 30/02 | (2012.01) |
| G06Q 10/04 | (2012.01) |
| G06Q 10/06 | (2012.01) |
| G06Q 10/10 | (2012.01) |

(52) U.S. Cl.
CPC ............ *G06Q 30/02* (2013.01); *G06Q 10/04* (2013.01); *G06Q 10/06* (2013.01); *G06Q 10/103* (2013.01)

(58) Field of Classification Search
CPC ........................................................ G06Q 10/00
USPC ............................................. 705/7.12, 7.13
See application file for complete search history.

(56) References Cited

U.S. PATENT DOCUMENTS

| 6,112,221 | A | 8/2000 | Bender et al. |
| 7,240,324 | B2 | 7/2007 | Casati et al. |
| 7,343,312 | B2 * | 3/2008 | Capek et al. .................. 705/8 |
| 7,660,773 | B1 * | 2/2010 | Kumar ........................... 706/13 |
| 8,468,042 | B2 * | 6/2013 | Jaluka et al. ................ 705/7.11 |
| 2002/0083165 | A1 * | 6/2002 | Nagata .......................... 709/223 |
| 2003/0009507 | A1 | 1/2003 | Shum |
| 2003/0036934 | A1 | 2/2003 | Ouchi |
| 2003/0195934 | A1 * | 10/2003 | Peterson et al. .............. 709/206 |
| 2003/0236689 | A1 * | 12/2003 | Casati et al. ...................... 705/7 |
| 2004/0034552 | A1 * | 2/2004 | Cole et al. ......................... 705/7 |
| 2004/0064830 | A1 | 4/2004 | Irving et al. |
| 2004/0078258 | A1 * | 4/2004 | Schulz et al. ..................... 705/9 |
| 2004/0220910 | A1 * | 11/2004 | Zang et al. ....................... 707/3 |
| 2005/0125738 | A1 * | 6/2005 | Srivastava et al. ............ 715/760 |
| 2006/0059253 | A1 | 3/2006 | Goodman et al. |
| 2006/0190944 | A1 * | 8/2006 | Moon et al. .................... 718/104 |
| 2007/0005522 | A1 * | 1/2007 | Wren .............................. 706/13 |
| 2007/0174101 | A1 | 7/2007 | Li et al. |

(Continued)

OTHER PUBLICATIONS

"Supporting Intra-and inter-Organizational Business Processes with Web Services", HangJing Zo, The University of Wisconsin-Milwaukee, Aug. 2006.*

(Continued)

*Primary Examiner* — Justin M Pats
*Assistant Examiner* — Pan Choy
(74) *Attorney, Agent, or Firm* — Shimokaji & Assoc., P.C.

(57) ABSTRACT

A method of assigning web service requests to service providers includes searching for an optimal assignment from all possible assignments using a genetic algorithm (GA) that represents possible assignments as chromosomes, and converging towards an assignment of web service request to service providers that maximizes overall business value for all workflows to the service providers. An adaptive mutation scheme is used to introduce mutation into populations of chromosomes. The mutation scheme includes a mutation rate that increases when chromosomes under evaluation fail to improve its workload against the metric over a certain number of generations.

25 Claims, 28 Drawing Sheets

(56) References Cited

U.S. PATENT DOCUMENTS

2007/0208691 A1 9/2007 Ramakrishnan
2007/0282655 A1* 12/2007 Jaluka et al. .................. 705/8
2008/0040510 A1* 2/2008 Warner et al. ............... 709/246

OTHER PUBLICATIONS

"Quality of Service (QoS) in Web Services", Tao Yu, University of California-Irvine, 2006.*
"Heuristics-Based Scheduling of Composite Web Service Workloads", by Thomas Phan et al., (hereinafter: Phan), MW4SOC'06, Nov. 27-Dec. 1, 2006, Melbourne, Australia.*
"Service Selection Algorithms for Web Services with end-to-end QoS Constraints", Tao Yu and Kwei-Jay Lin, Department of Electrical Engineering and Computer Science, University of California-Irvine, 2005.*
"Heuristics-Based Scheduling of Composite Web Service Workloads", by Thomas Phan et al., MW4SOC'06, Nov. 27-Dec. 1, 2006, Melbourne, Australia.*
"Dynamic Workflow Composition Using Markov Decision Processes", by Prashant Doshi et al., International Journal of Web Services Research; Jan.-Mar. 2005; 2, 1; ABI/INFORM Global, p. 1.*
An Experimental Comparison of Binary and Floating Point Representations in Genetic Algorithms, by Cezary Z. Janikow et al., 1991, Department of Computer Science, University of North Carolina, Chapel Hill, NC 27599.*
"A Comparison of Particle Swarm Optimization and the Genetic Algorithm", Rania Hassan et al., 2005, Massachusetts Institute of Technology, Cambridge, MA. 02139.*
"Heuristics-Based Scheduling of Composite Web Service Workloads", by Thomas Phan and Wen-Syan Li, IBM Almaden Research Center, MW4SOC '06, Nov. 27-Dec. 1, 2006 Melbourne, Australia.*
Tao Yu and Kwei-Jay Lin, "Adaptive algorithms for finding replacement services in autonomic distributed business processes," Proc. of the 7th International Symposium on Autonomous Decentralized Systems}, Chengdu, China, 2005.
Tao Yu and Kwei-Jay Lin., "Service selection algorithms for web services with end-to-end qos Constraint, Inf. Syst. E-Business Management," 3(2):103-126, 2005.
Tao Yu and Kwei-Jay Lin, "Qcws: An implementation of qos-capable multimedia web services. Multimedia Tools and Applications," 30(2):165-187, 2006.
Tao Yu, Yue Zhang, and Kwei-Jay Lin, "Efficient algorithms for web services selection with, end-to-end qos constraints," ACM Transactions on the Web (TWEB), 1(1), 2007.

* cited by examiner

| Experimental Parameter | Comment |
|---|---|
| Workflows | 5 to 100 |
| Business process per workflow | uniform random: 1 to 10 |
| Service types | 10 |
| Service providers per service type | uniform random: 1 to 10 |
| Workflow Quality of Service goal | uniform random: 10 to 30 second |
| Service provider completion time ($\alpha$) | uniform random: 1 to 12 second |
| Service provider maximum concurrency ($\beta$) | uniform random: 1 to 12 |
| Service provider degradation coefficient ($\chi$) | uniform random: 0.1 to 0.9 |
| Business value for successful workflows | uniform random: 10 to 50 points |
| Business value for acceptable workflows | uniform random: 0 to 10 points |
| Business value for failed workflows | uniform random: -10 to 0 points |
| Genetic Algorithm: number of parents | 20 |
| Genetic Algorithm: number of children | 80 |
| Genetic Algorithm: number of generations | 1000 |

FIG. 12

QUALITY OF SERVICE AWARE SCHEDULING FOR COMPOSITE WEB SERVICE WORKFLOWS

BACKGROUND

The present invention relates to methods and apparatus for scheduling, and in particular, to methods and apparatus for scheduling composite workloads comprising related workflows in order to maximize business value across all the related workflows.

Response time of an electronic commerce website in completion of requested transactions is a key aspect of user satisfaction of the service offered by the electronic commerce website. Therefore, it is advantageous for the operator of the electronic commerce website to provide methods and apparatus to provide expedient response time to web service request.

A typical web service request to an electronic commerce web site may be decomposable into related workflows of web services that can then be individually executed. For example, a travel arrangement request may be decomposed into a airlines ticket purchase workflow, a hotel room selection workflow and a car rental workflow. In turn, the workflows themselves may be further decomposable into a series of business steps. For example, an electronic purchase workflow may be comprised of a first business step to authenticate a user, a second business step to authenticate the credit card entered by the user by communicating with a credit card authentication server, a third business step to collect information regarding the purchase amount from an electronic merchant, a fourth business step to perform a check on availability of sufficient credit, a fifth business step to confirm the transaction, and so on. Each workflow can be thought of as a user of a variety of web services. The web services desired by a workflow may in turn be offered by more than one web service providers, For example, in the electronic purchase workflow example given above, a credit card server may offer card authentication service and an electronic commerce server may offer purchase service, etc.

To meet the objective of expedient response to user requests, prior art electronic commerce web sites use such decomposition of user request into business processes to allocate the business process tasks to service providers. The service providers also offer quantified quality of service measurements on the services offered. For example, service providers advertise a guaranteed turnaround time for business process execution.

One prior art approach is to assign all requests for a particular type of service to the provider with the best guaranteed turnaround time. However, this approach can lead to performance degradation due to its servers becoming overloaded.

In the context of service assignment and scheduling, the publication authored by Zeng. L. et al. (2003), "Quality Driven Web Services Composition", In Proc. of WWW (hereafter "Zeng"), maps web service calls to potential servers, but Zeng does not address optimizing aggregate business values across workflows by assigning business processes to a plurality of service providers.

The publication authored by Urgaonkar, B. et al. (2005), "Dynamic Provisioning of Multi-Tier Internet Applications," (hereafter "Urgaonkar") presents a dynamic provisioning approach that uses both predictive and reactive techniques for multi-tiered Internet application delivery, but Urgaonkar does not describe how to optimize aggregate business values across workflows by assigning business processes to a plurality of service providers in view of alternate query execution plans and replicated data sources.

Therefore, there is a need for an improved method and apparatus for scheduling of business processes based on the service type used so that the scheduling process maximizes a desired business value totaled across all the workflows related to the requests.

BRIEF SUMMARY

In one aspect, the present invention describes a computer-implemented method of assigning a web service request to a plurality of service providers. The method comprises decomposing the web service request into a plurality of workflows; analyzing the plurality of workflows to determine a plurality of business processes; associating a web service type with each of the plurality of business processes; assigning a business value to each of the plurality of business processes; and searching for an optimal assignment of said plurality of business processes to the service providers; the optimal assignment responsive to an overall business value of executing the web service request; wherein the searching further includes solving a combinatorial optimization problem.

In another aspect, a computer program product is disclosed comprising a computer useable medium including a computer readable program, wherein the computer readable program when executed on a computer causes the computer to execute a scheduling process for assigning web service requests to a plurality of service providers. The computer program product includes computer usable program code for decomposing the web service request into a plurality of workflows and a plurality of business processes; computer usable program code for generating a plurality of mappings between the plurality of business processes and a plurality of web service types; computer usable program code for assigning a plurality of business values; and computer usable program code for searching for an optimal assignment of the plurality of business processes to a plurality of service providers; wherein the optimal assignment is responsive to an overall business value calculated using the plurality of business values In yet another aspect, an electronic commerce system comprising a web server for receiving a web service request and a plurality of service providers' servers wherein the web server is configured to execute a request assignment program; the request assignment program comprising a decomposition module for decomposing the web service request into a plurality of business processes and an assignment module for calculating an optimal assignment of the plurality of business processes to the plurality of service providers' servers to minimize an overall business value of executing the web service request; wherein the overall business value is responsive to sum of duration of execution of all business processes of the web service request is disclosed.

These and other features, aspects and advantages of the present invention will become better understood with reference to the following drawings, description and claims.

BRIEF DESCRIPTION OF THE SEVERAL VIEWS OF THE DRAWINGS

FIG. 12 tabulates parameters of an exemplary embodiment of the present invention;

DETAILED DESCRIPTION

Broadly, embodiments of the present invention provide methods and apparatus for assigning a plurality of business processes to a plurality of service providers. The plurality of business processes are organized as a plurality of workflows. When a business process requests service from a service provider, the service provider provides service with Quality of Service (QoS) measured by a metric such as completion time according to a Service Level Agreement (SLA). If business value is defined by a score categorizing end-to-end completion time for the requested service, embodiments of the present invention assign requests from the plurality of business processes to the plurality of service providers in order to maximize the increase in net business value obtained by summing the business values resulting from end-to-end completion of each request for service originating from each business processes within the workflow.

The present invention may be implemented in an application server, an electronic commerce server or a web server.

Figure 1:
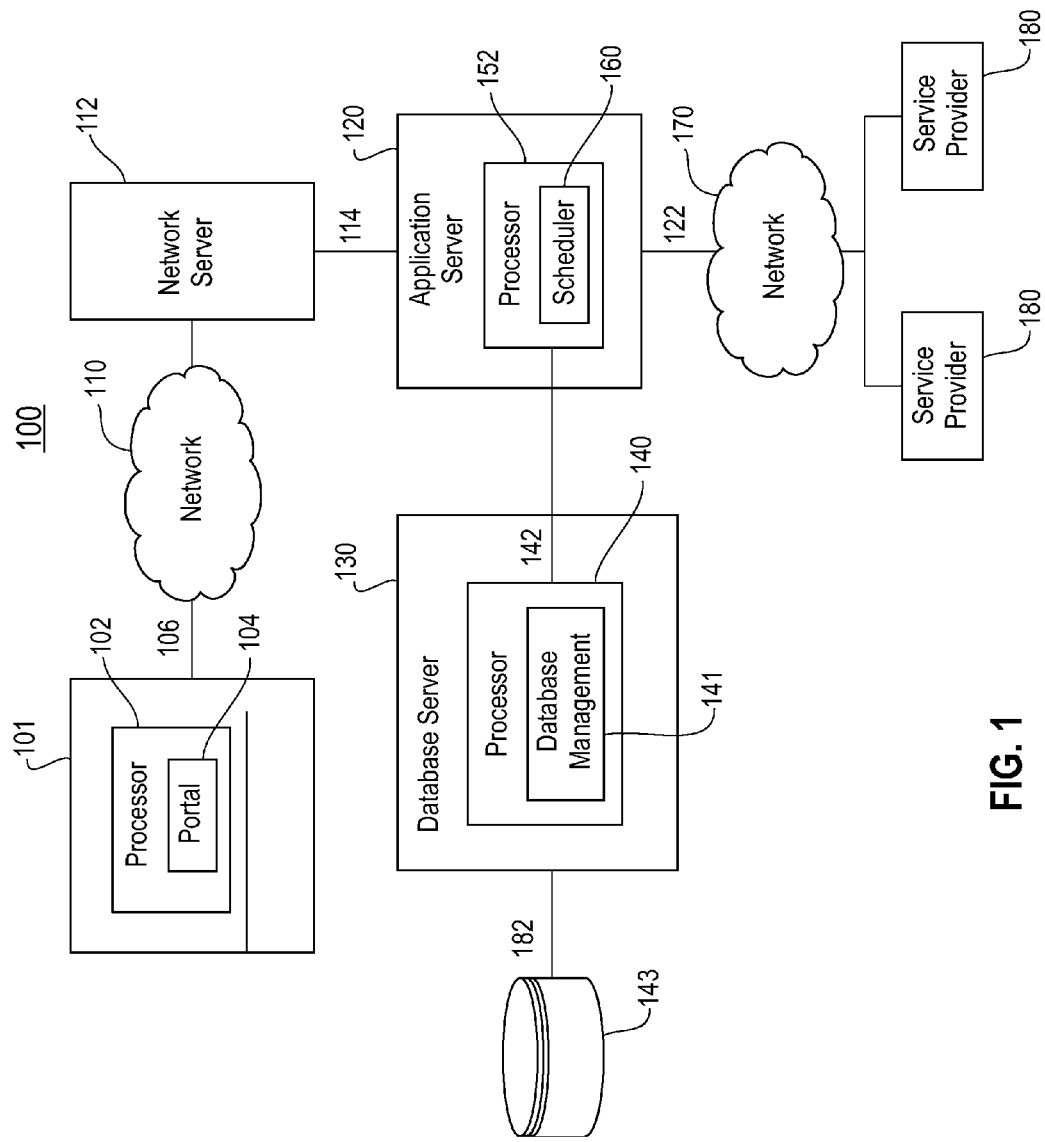
FIG. 1 is a block diagram of exemplary computer network where the present invention can be implemented.

Referring to the drawings, FIG. 1 shows a network diagram illustrating an exemplary system 100 where an embodiment of the present invention can be implemented In particular, a computer 101 having a first processor 102 executing the instructions of a portal process 104 communicate with a first network 110 over a first network segment 106. A network server 112 communicates with the first network 110 over a second network segment 108 and with an application server 120 having a second processor 152 executing the instructions of a scheduling process 160 over a third network segment 114. The scheduling process 200 may assign requests from business processes to service providers according to an exemplary embodiment of the present invention. The second processor 152 may communicate with the application server 120 over a fourth network segment 146. The application server 120 further may communicate with a database server 130 having a third processor 132 executing the instructions of a database management process 141 over a fifth network segment 144. The third processor 132 may communicate with a database 142 over a sixth network segment 182. The application server 120 may communicate with a second network 170 over a seventh network segment 122 communicating with a plurality of service provider networks 180; each service provider network comprising at least one service provider server configured to execute a business process. It will be appreciated by practitioners of the art that while the network shown above is depicted in FIG. 1 as discrete servers and computers 101, 112, 120 and 130, several embodiments are possible that implement one or more functions on the same hardware platform or implement a single function on multiple hardware platforms as a distributed computer. In an exemplary embodiment, the application server 120 may be a web server configured to receive execution requests from a user or from another server to which it is communicatively connected. The web server may be implemented, for example, on one or more computers, each computer having input-output interfaces, hard drive disk storage, a central processor unit, a memory unit and a bus for signal communication.

Figure 2:
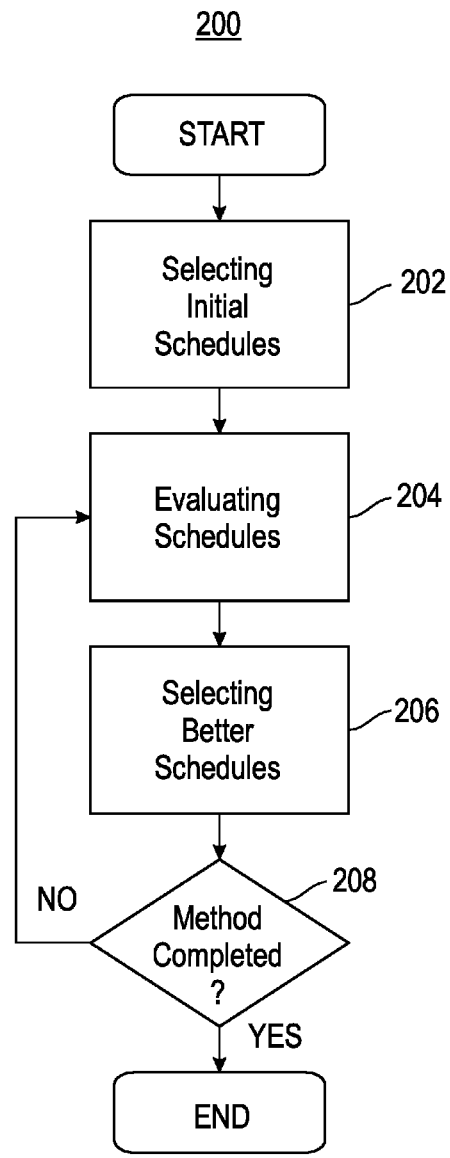
FIG. 2 is a flowchart illustrating high level steps of a method of determining schedule of execution of a business request in accordance with an embodiment of the present invention.

FIG. 2 is a flowchart illustrating an exemplary embodiment of the scheduling process 200. The scheduling process 200 may start by selecting a plurality of candidate schedules 202 that assign requests from business processes to service providers. The scheduling process 200 may then perform the step of iteratively evaluating the plurality of schedules 204 according to a metric. The metric may be formulated to optimize a business objective, such as the response time to completion of all business tasks, represented as a business value parameter associated with each business process. The scheduling process 200 may then perform the step of selecting better schedules 206 according to the result of evaluating schedules until the scheduling process is complete 208. The scheduling process may use a predetermined cost function to evaluate cost of a schedule and may decide a schedule to be better if it reduced the cost function. In another embodiment, the scheduling process 200 may perform the step of selecting better schedules 206 by selecting the schedule with the lowest evaluated cost function from among all possible schedules. If there is a tie, it might use additional criteria such as a preferred service provider, or other business considerations, to break the tie.

Figure 3:
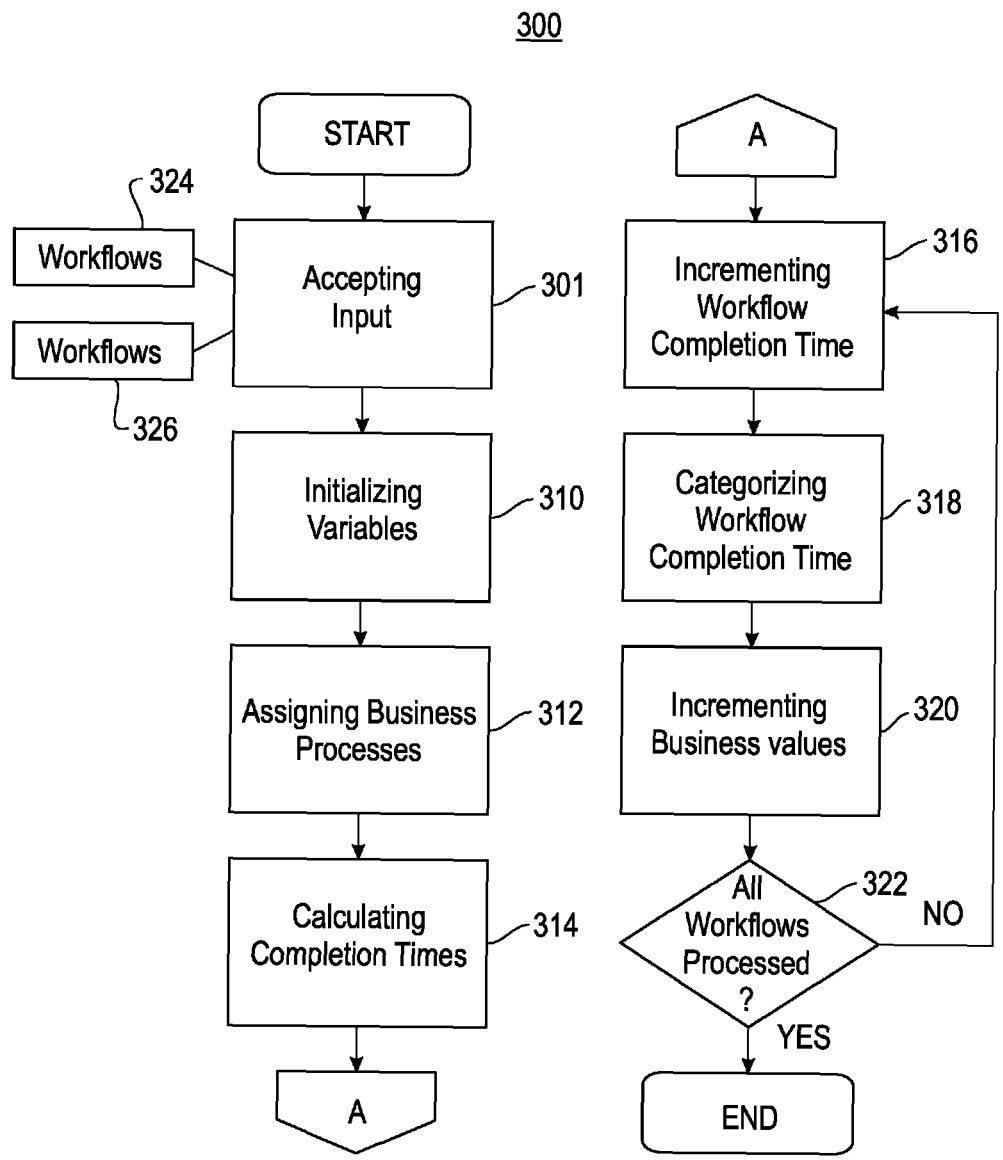
FIG. 3 is a flowchart illustrating high level steps of a method of scheduling multiple workflows in accordance with an embodiment of the present invention.

FIG. 3 is a flowchart 300 illustrating steps of an exemplary embodiment of a scheduling process 200. In this exemplary embodiment, the scheduling process 200 may start by a step 301 of accepting input including an input set of workflows 324 and an input set of mappings 326 of service type request to service provider for each workflow in the set of input workflows. The scheduling process 200 may obtain workflows 324 by decomposing a web service request into workflows. The scheduling process 200 may further perform the task of analyzing the workflows to determine business processes that make up each workflow. In one embodiment, the task of decomposing a web service request into workflows and further decomposing into business processes may be performed in a decomposition module that is a part of the scheduling process 200. The scheduling process 200 may then perform the task of associating a web service type with each of the business processes. The scheduling process 200 may then perform the task of searching for an optimal assignment of the business processes to service providers as follows. In one embodiment, the task of calculating an optimal assignment may be performed in an assignment module that is a part of the scheduling process 200.

The scheduling process 200 may continue by initializing variables 310 including setting initial business values to zero, and assigning business processes to service providers 312 according to the input set of mappings 326. The scheduling process 200 may continue by calculating the completion times 314 for each service provider providing each service type based on the SLA between the business processes and the service provider. The scheduling process 200 may continue by incrementing workflow completion time 316 for each workflow by summing the completion time for each business process in the workflow. The scheduling process 200 may further continue by categorizing the workflow completion time 318 for each workflow. If the workflow completion time is less than an agreed QoS limit the workflow is categorized as successful, else if the workflow completion time is less than κ times the agreed QoS limit, the scheduling process 200 may categorize the workflow as acceptable, else the scheduling process 200 may categorized the workflow as failed. The scheduling process 200 may continue by incrementing business value 320 for each workflow according to the incremental business value score appropriate for the category determined at step 316. If not all workflows have been processed 322 the scheduling process 200 may continue with the next workflow at step 316, until all workflows have been processed, when the scheduling process 200 may end.

Figure 4:
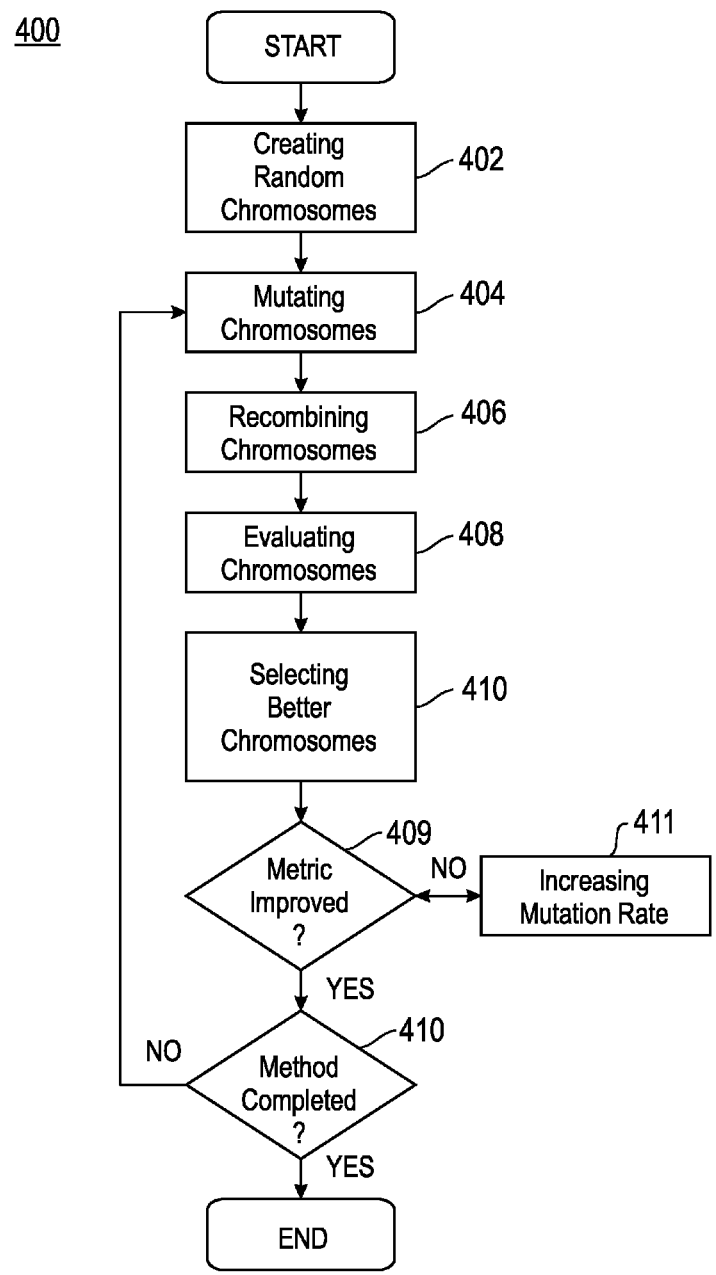
FIG. 4 is a flowchart showing the steps of an exemplary genetic search method for assigning business processes to service providers, in accordance with an embodiment of the present invention.

FIG. 4 is a flowchart showing steps of an exemplary embodiment of a method of selecting better schedules 206 referenced in FIG. 2, according to a genetic search method of the present invention. The steps of the genetic search method include creating random chromosomes 402, then iteratively, mutating chromosomes 404, recombining chromosomes 406, evaluating chromosomes 408; and selecting better chromosomes 410, until a predetermined number of iterations have been completed 416. If the business value metric has not improved since the previous iteration, the method of selecting better schedules 206 may continue by increasing the mutation rate 414 by a predetermined amount, with such steps being described below and further shown in FIG. 6.

Figure 5:
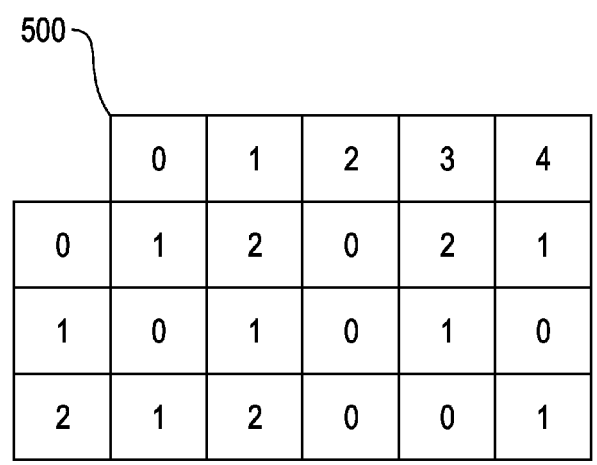
FIG. 5 is a tabular representation that shows an exemplary chromosome representing a scheduling assignment of workflow and service type to each service provider.

The step of creating random chromosomes 402 may assign business processes to service providers at random for each workflow. The term "chromosome" refers to a particular assignment of business processes to service providers. FIG. 5 shows an exemplary chromosome 500, organized as a table of assignment of business processes to service providers. Each row may represent a workflow and each column may represent a service type. In this exemplary chromosome, there are three workflows (numbered sequentially from 0 to 2) and five service types (numbered sequentially from 0 to 4). In workflow 1, any request for service type 3 goes to provider 1. In this exemplary embodiment of the present invention, the service provider is identified by an integer in the range from zero to the service type identifier, so that provider 1 for service type 3 is not intended to represent the same service provider as provider 1 for other service types. In particular, the chromosome matrix 500 having entry indexed by row i and column j may be non-negative integer values at random within the range 0 to j provided by any random number generator known in the art.

The step of mutating chromosomes 404 may change any one of the service provider assignments in the chromosome matrix 500 to another within the available range so that one of the entries indexed by row i and column j, with the values i and j both provided by a random number generator output that produces non-negative random numbers. Thus, the column index may be changed from a non-negative integer in the range 0 to j to another non-negative integer in the range 0 to j. In an exemplary embodiment of the present invention, an entry may be changed only when the random number generator provides a non-negative integer i which is less than or equal to the current number of workflows, and the random number additionally provides a non-negative number j which is less than or equal to the number of service providers for service type i. Thus, for a business process in a workflow denoted by i and utilizing service type denoted by j, the chromosome matrix entry indexed by row i and column j is the identifier for the service provider to which the business process is assigned for requests for that service type.

Figure 6:
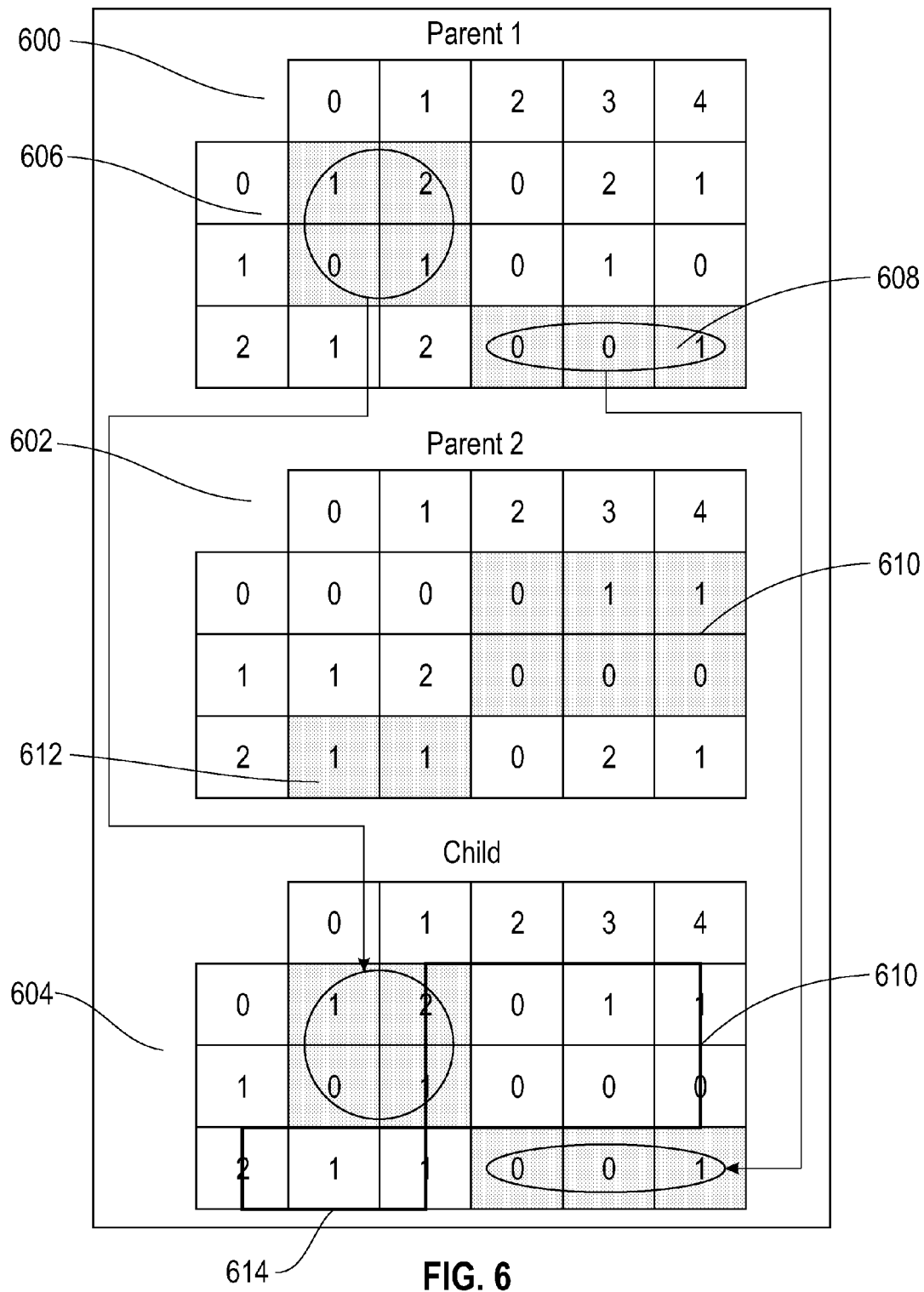
FIG. 6 is a partial illustration of the step of combining two parent chromosomes to produce a child chromosome as performed by genetic search method in accordance with an embodiment of the present invention.

Referring to FIG. 6, an exemplary step of recombining chromosomes 406 referenced in FIG. 4 may be implemented by applying a one-point crossover method twice, once along each of the two dimensions of each parent chromosome matrix. For example, consider an origin of coordinates, chosen at random from the first parent chromosome 600, together with a corresponding location in the second parent chromosome 602. Matrix elements from quadrants II and IV from the first parent (labeled 606 and 608 respectively) and matrix elements from quadrants I and III from the second parent (labeled 610 and 612 respectively) may be used to create a new child chromosome matrix 604. This approach may ensure that contiguous chromosome matrix elements are kept together as they are transmitted from parent to child. In this exemplary embodiment of the present invention, the step of evaluating schedules 204 referenced in FIG. 2 may be implemented by the step 408 of evaluating chromosomes. In particular, the steps shown in flowchart 400 may be used to evaluate chromosomes.

If the business value metric has not improved (e.g., increased) since the previous iteration, method 206 may continue by increasing the mutation rate 414 by a predetermined amount. The predetermined amount may be a constant, or may be a function of the number of workflows, etc. If method 206 has not been completed, e.g., the current number of generations of chromosomes is less than a predetermined number such as 1000, method 206 may iterate at step 404.

Figure 7:
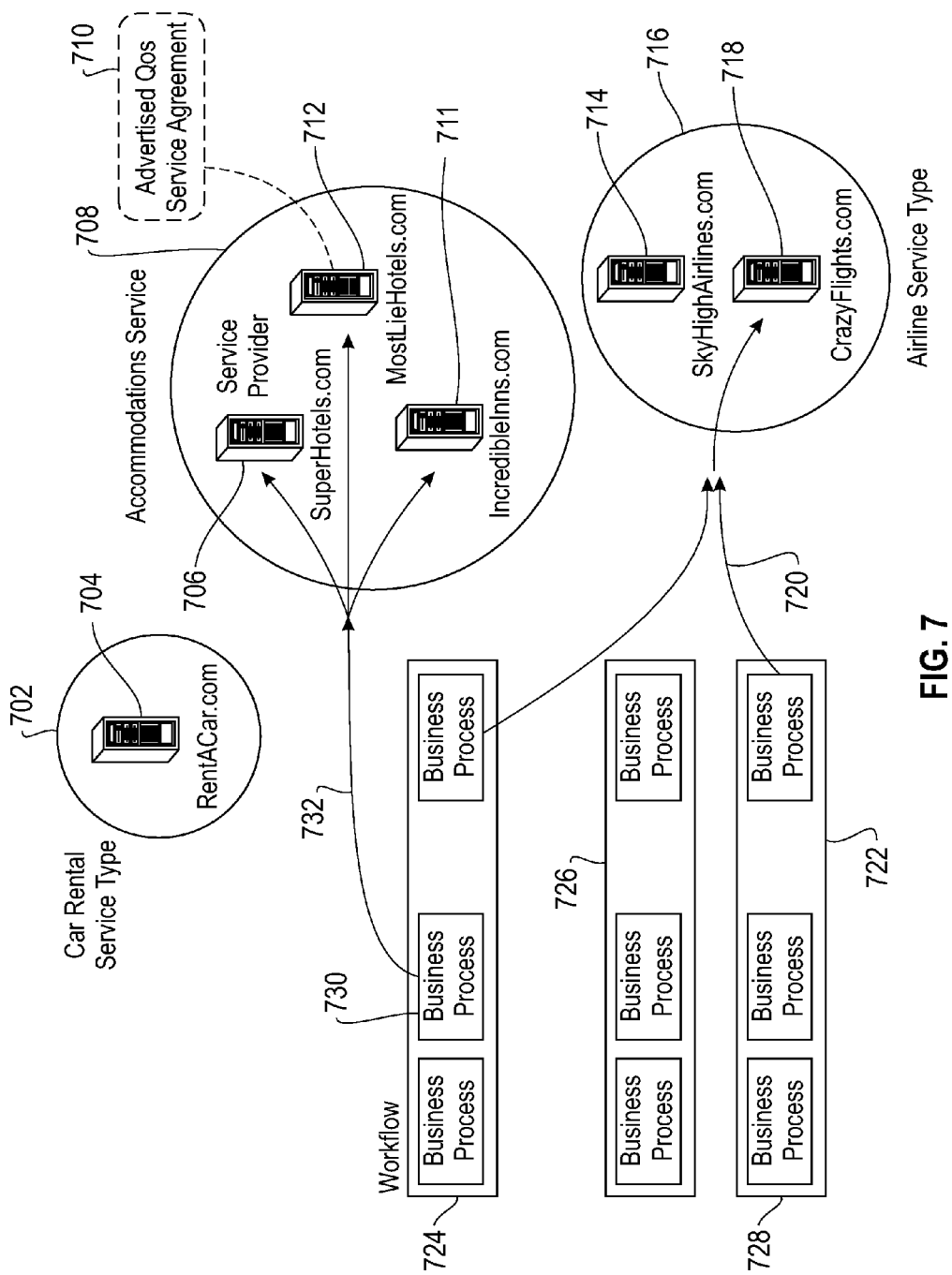
FIG. 7 is a diagram showing an example of a vacation planning task divided among various workflows, each having multiple business processes, and associated service types; in accordance with an embodiment of the present invention.

As an example, FIG. 7 shows three workflows: workflow 0 labeled 724, workflow 1 labeled 726, and workflow 2 labeled 728 respectively, each workflow including a plurality of business processes. FIG. 7 additionally shows three service types: a first service type labeled 702, 708 providing accommodations service having three providers: a first provider for the second service type 706 (SuperHotels.com), a second provider for the second service type 712 (HostileHotels.com) and, a third provider for the second service type 711 (IncredibleInns.com), together with a third service type 716 providing airline service type having two providers, a first provider for the third service type 714 (SkyHighAirlines.com) and a second provider 718 for the third service type (CrazyFlights.com). In a further exemplary embodiment of the present invention, service providers may provide other than three service types.

If there are three service providers for service type 2 (accommodations service type 708), with SuperHotels.com denoted by service provider 0, HostileHotels.com denoted by service provider 1, and IncredibleInns.com denoted by service provider 2, then in workflow 1, all requests for accommodations made by business processes are assigned to SuperHotels.com. If there are two providers for service type 3 (airline service type 716), e.g., SkyHighAirlines.com denoted by service provider 0, and CrazyFlights.com denoted by service provider 1, then CrazyFlights.com is not necessarily the same service provider as SuperHotels.com.

Referring to the drawings, FIG. 7 shows a plurality of exemplary business processes 724, 726, 728 each of which may request a service type selected from the group consisting of a first service type 22, a second service type 716, and a third service type 710. In this particular exemplary embodiment of the present invention, workflows such 724, 726, and 728 may comprise a plurality of sequentially ordered business processes 11a 730. The arrangement and execution of the plurality of business processes such as 724, 726, and 728 and the plurality of data flows 732 between them may all be managed by a composition or choreography tool such as DAML-S, or the like (see Ankolekar, A et al, "DAML-S: Semantic Markup for Web Services," In Proc. of the International Semantic Web Working Symposium, 2001, hereafter "Ankolekar"; and, Srivastava, B. and Koehler, J. "Web Service Composition Current Solutions and Open Problems," ICAP 2003, hereafter "Srivastava"). A portal 104 referenced in FIG. 1 may provide information for scheduling between the workflows such as 724, 726, and 728 and the web service provider 704 of the first service type 702, the web service providers 706, 712, and 711 of second service type 716, and the web service providers 714 and 718 of the third service type 716, who may have a Quality of Service (QoS) requirement expressed as a Service Level Agreement (SLA) 710 to complete each request from each business processes 722 within a predetermined amount of time. Upon completion or failure, each workflow 724, 726, and 728 may be assigned a net business value, such as a representation of the effectiveness of the workflow to accomplish its collective tasks on time. Each SLA 710 may provide a plurality of QoS levels for service providers providing a plurality of levels (tiers) of services according to the SLA 710. As an example of tiers of service, the SLA 710 may specify that the first, second and third tiers of service are expected to provide a complete response to a request made by a business process within 10, 20, and 100 microsecond, respectively.

A workflow such as any of 724, 726 or 728 may be categorized as "successful" if it completes within its QoS requirement; "acceptable" if it completes within a constant factor ($\kappa$) of its QoS requirement; or "failing" if it completes later than $\kappa$ times its QoS requirement. For each of the above categories, a business value score may be assigned to the workflow 724, 726 or 728 with successful workflows assigned the highest positive score, acceptable workflows assigned a less positive score than successful, and failing workflows assigned a less positive score than acceptable.

In the simulation experiments described below, individually recorded business value scores typically may have a statistical distribution that differs significantly from a statistical uniform distribution across workflows, in particular when the scheduling process 200 referenced in FIG. 1 schedules some workflows to complete at a higher priority than other workflows.

Service Level Agreements (SLAs) may take the form of a linear degradation of average performance under workload. The SLAs may be defined in terms of parameters such as expected completion time ($\alpha$), maximum concurrency ($\beta$), and fractional coefficient ($\gamma$). If a workload exceeds the maximum concurrency $\beta$, the expected average completion time for a workload of size denoted by $\omega$ may be given by the linear functional form $\alpha+\gamma(\omega-\beta)$. The SLA 710 may further vary with workload according to a functional form that is monotonic with respect to workload. Since the SLA degrades with workload, not all service providers will complete their related workflow within the respective workflow's QoS limit on average.

Since the scheduling process 200 assigns business processes to service providers to optimize net business value across workflows, some workflows may have to fail in order for other workflows to succeed. Although an exhaustive search of all the possible assignments may eventually find the best schedule, the computational complexity is prohibitively high for practical application. Suppose there are W workflows with an average of B business processes per workflow. In the worst case, each business process requests one service type, for which there are P providers. Hence, there are $W \times P^B$ combinations to explore to find the optimal assignment of business processes to service providers. This number of combination has exponential order. For example, if for W=100 workflows, B=10 business processes, and P=3 providers, an exhaustive search would have to explore 5,904,900 combinations.

One possible method of search for the optimal combination comprises a genetic method (see Holland, J.: Adaptation in Natural and Artificial Systems: An Introductory Analysis with Applications to Biology, Control, and Artificial Inteligence," MIT Press, 1992 hereafter "Holland"; and, Goldberg, D. "Genetic Algorithms in Search, Optimization and Machine Learning," Kluwer Academic Publishers, 1989 hereafter "Goldberg"). A genetic method simulates Darwinian natural selection by having members of a population compete to survive in order to pass their genetic chromosomes on to the next generation; after successive generations the chromosomes may tend to converge to the next generation. In various embodiments of the present invention, methods other than a genetic method may be used to solve for the business process assignment, such as local-search stochastic hill-climbing methods, and global-search simulated annealing methods.

When requests for service are made via the portal 104 referenced in FIG. 1, the requests may comprise new workflows. These new workflows may be aggregated to create a new set of workflows until a periodic timer runs out or predetermined maximum number of workflows in a set of workflows is reached. When the new set of workflows is scheduled by scheduling process 200 referenced in FIG. 1, the previously scheduled set of workflows may not have already ended. If the previously scheduled set of workflows has ended, the new set of workflows may be scheduled according to the methods illustrated in FIGS. 2, 3 and 4. If the previously scheduled set of workflows has not already ended, the remainder of the current set of workflows may be aggregated with the new set of workflows, and the aggregate set of current and new workflows scheduled according to the methods illustrated in FIGS. 2, 3, and 4 so the scheduling process 200 can account for the information that some of the service providers may be in the process of completing requests for service from some of the business processes.

Figure 8:
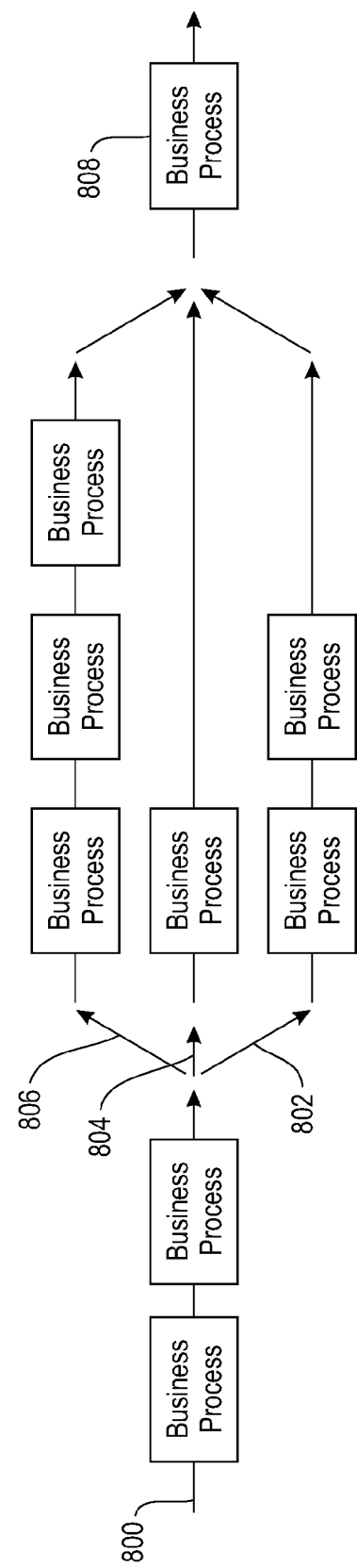
FIG. 8 is a block diagram that illustrates a workflow made up of sequentially executed and concurrently executed business processes, in accordance with an embodiment of the present invention.

Referring to FIG. 8, in general a workflow comprising business processes may have a branch according to a business decision that has been made to create non-sequential execution when workflows are mutually independent. In contrast, FIG. 1 shows workflows 10a, 10b, and 10c, each of which comprises a plurality of business processes executed in sequential order. An example of such business decision is that a first sequential workflow 800 may branch into a first branched workflow 802, a second branched workflow 804, and a third branched workflow 806 because they are determined to be mutually independent (e.g., scheduling business process requests for a hotel and airline), and the branched workflows 802, 804, and 806 may rejoin to create a second sequential workflow 808 (e.g., scheduling a business process request for a rental car available from an airport when the hotel and airline have been booked and an arrival time at the airport has been planned).

Such workflows may be specified using an orchestration language which defines how business processes interact, messages are exchanged, activities are ordered, and exceptions are handled, such as BPEL and the like.

Figure 9:
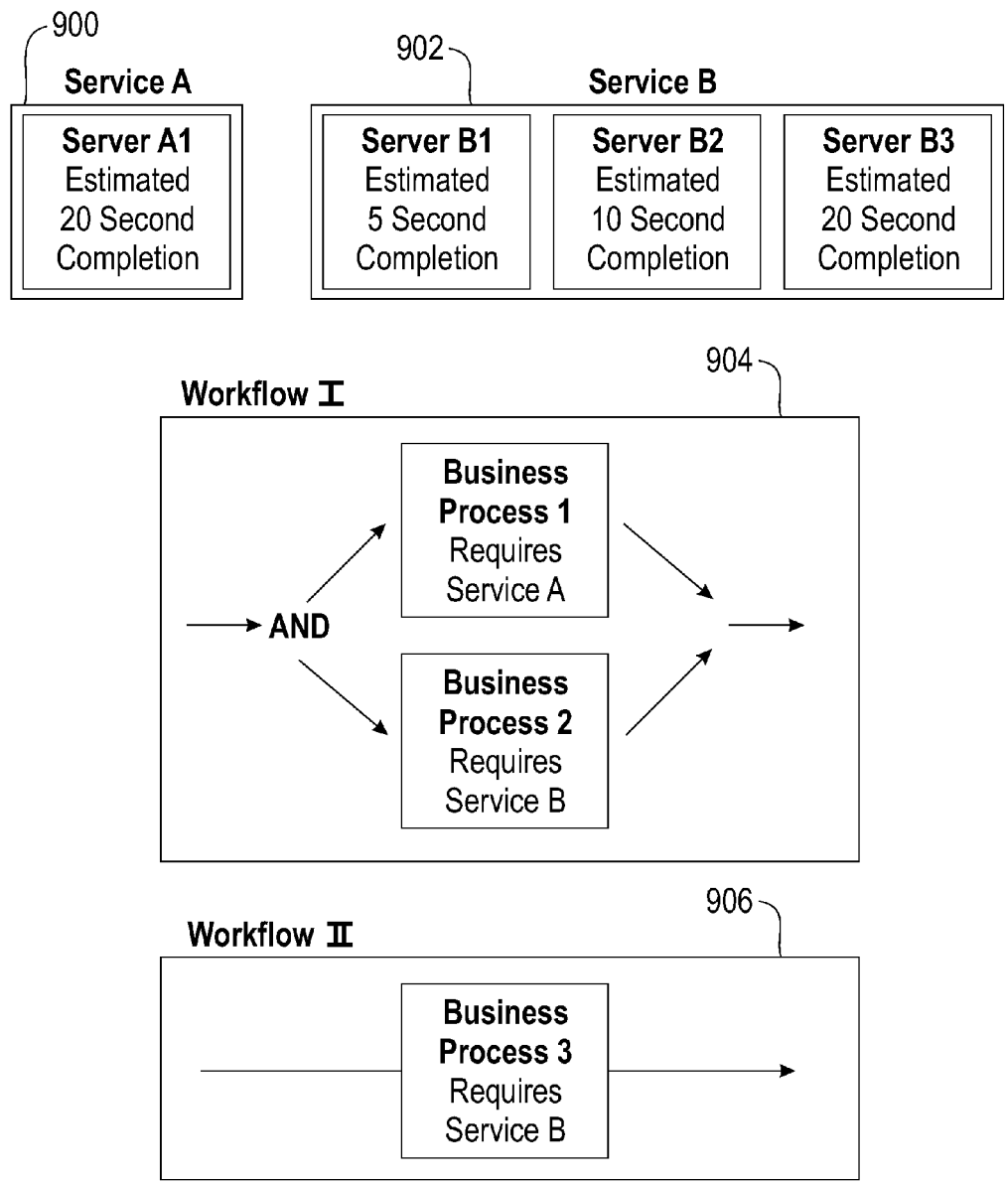
FIG. 9 is a block diagram that illustrates various components of a composite web service, in accordance with an embodiment of the present invention.

Referring to FIG. 9, a set of workflows executed in parallel such as 802, 804, and 806 referenced in FIG. 8 may be scheduled by selecting the maximum execution time across all the branches of the parallel workflow at the step of evaluating schedules 204 referenced in FIG. 2, since the slowest of the branches 802, 804, and 806 determines the end-to-end completion time for the set of workflows executed in parallel. In particular, FIG. 9 depicts, as an example, the estimated completion times for workflows related to a first service type 900 with one service provider and a second service type 902 with three service providers. A first workflow 904 has, for example, a branch with two business processes and a second workflow 906 has only one business process. In the first workflow 904, the slowest branch is through business process 1 which service provider denoted by A1 is expected to take 20 seconds to complete. Business process 2 may be assigned to any of the service providers denoted by B1, B2, or B3, but since the workflow's critical path is through business process 1, business process B3 may be assigned to B3, the slowest service provider for the second service type 902, so that the faster remaining service providers for the second service type 902 may be assigned to other business processes requesting the second service type 902, such as business process 3.

Referring to FIG. 9, a genetic search method may converge towards an assignment where business process 1 is mapped to service provider A1, business process 2 is mapped to service provider B3, and business process 3 is mapped to service provider B1, resulting in an exemplary overall execution time of 20 seconds for the first workflow 902 and 5 seconds for the second workflow 904.

The sequential workflow 54 may also follow an if-then-else conditional branch where only one branch is taken according to a business logic decision. Since the branch taken is known only at runtime, the scheduling process 200 referenced in FIG. 2 may schedule such workflows in a conservative manner by taking the maximum execution time of the branches.

Figure 10:
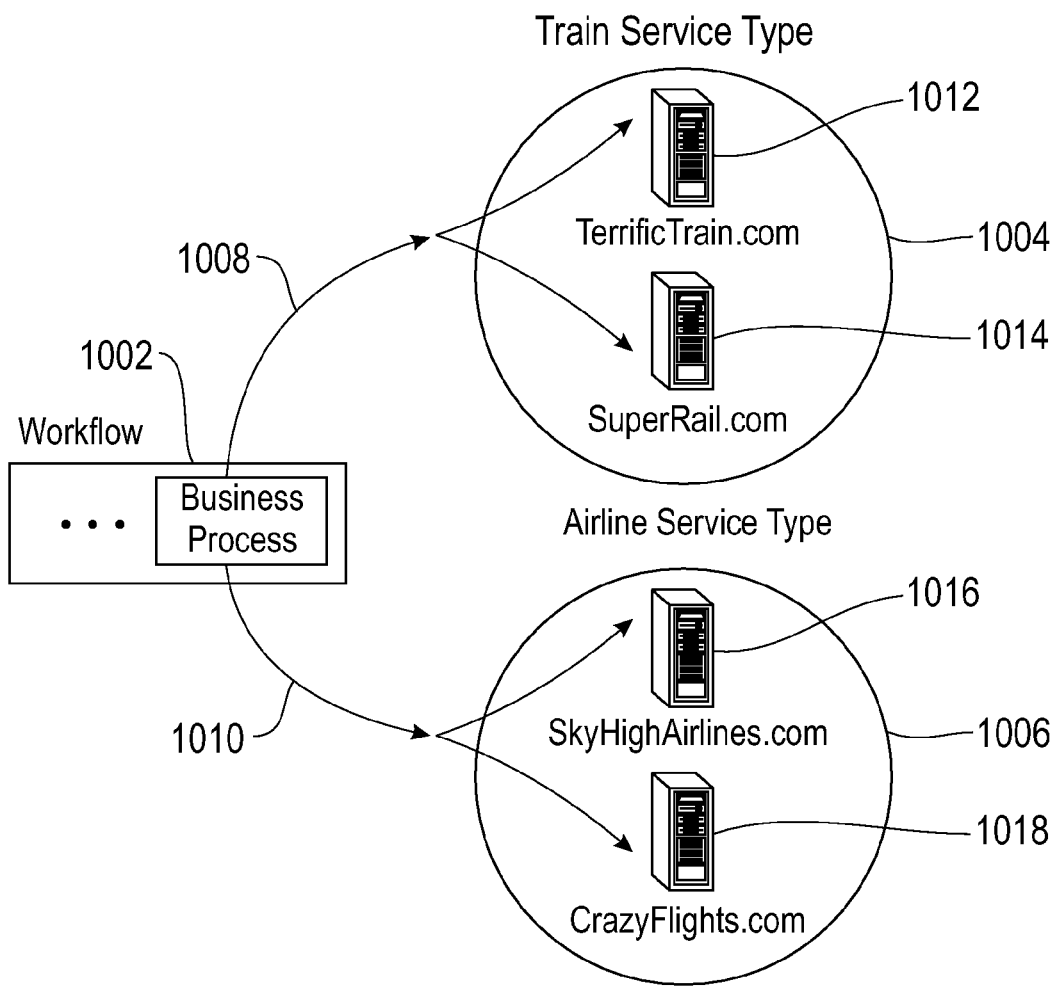
FIG. 10 is a block diagram that depicts how a business process to be assigned to a service provider may use a union of service types.

Referring to FIG. 10, in general, according to a business logic rule, a workflow 1002 may have a business process that uses a union of service types, wherein the business process may select at least one of a plurality of service types if these service types provide service considered equivalent by the SLA 710 between the business processes and the plurality of web service providers. (In contrast, referring to FIG. 7, each business request for service of a particular service type was fulfilled by a service provider of only one type.) As an example, FIG. 10 depicts a workflow 1002 including a business process requesting transportation for which the SLA 710 specifies may be equivalently provided by a train service provider or an airline service provider or both. The SLA 710 specifies the transportation service type as a union of train service type 1004 provided by a first train service provider 1012 and a second train service provider 1014, and airline service type 1006 provided by a first airline service provider 1016 and a second airline service provider 1018. The execution time for this business process may then be evaluated by the genetic search method as being equal to the minimum execution time across the union of all service providers for the train service type 1004 and airline service type 1006.

Figure 11:
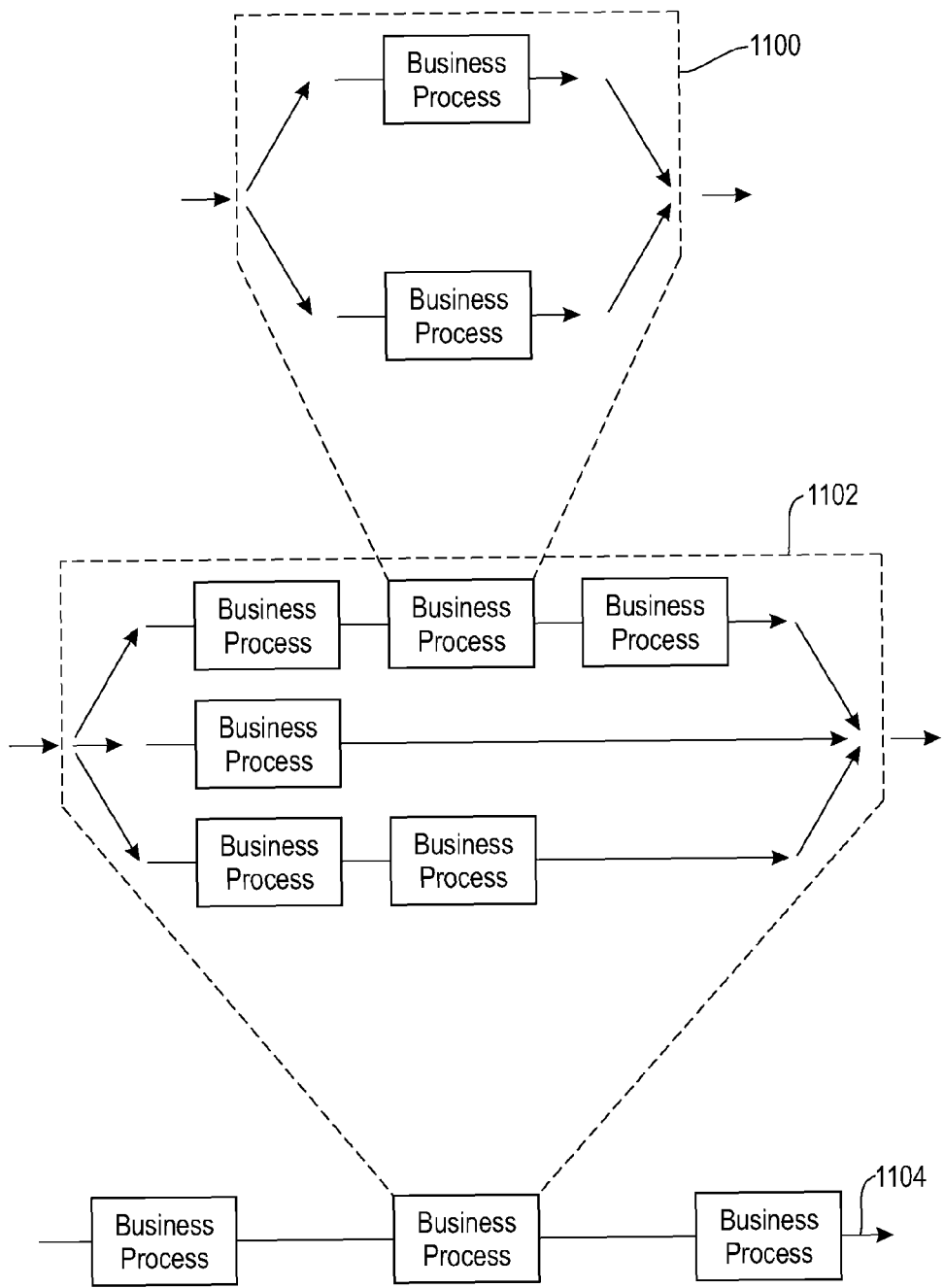
FIG. 11 is a block that shows how parent business processes may be executed as concurrent or sequential child business processes, in accordance with an embodiment of the present invention.

Referring now to FIG. 11, at the step of evaluating schedules 204 referenced in FIG. 2, a first workflow block 1100 comprising a plurality of branched workflows may be recursively decomposed into a second workflow block 1102 comprising a plurality of workflows, and further decomposed into a third workflow block 1104 that has no branches. The step of evaluating schedules 204 may evaluate the completion time for the third workflow block 1104 that has no branches as for a sequential workflow, return from recursion, and, eventually, evaluate the execution time for the first workflow block 1104. Thus, it can be seen that the present invention works on nested workflows by recursively evaluating execution time. Some parallel branches as shown in 1102 may be conditionally implemented using and/or logic. In such a case, evaluating schedules is done by iteratively evaluating the logical condition and then evaluating execution time of the actually executed business processes.

Although the SLA 710 specifies a predetermined QoS limit for the average execution time for each service type provided by each service provider, the execution time for each request made by each business process may be subject to fluctuations caused by bursty computational loads, database locking, transmission delay on a communications network segment, and the like. To reduce the impact of such delays on the scheduled assignments of business processes to service providers, SLAs may comprise an optional safety-margin by which the estimate of execution time is increased, based on historical averages of service delays. Each business process and all dependent business processes may optionally be terminated when a service provider does not provide service within a predetermined allotment of time.

If a service provider provides a plurality of service types, such as a travel agency that may provide reservation booking for a union of train and airline service types illustrated in FIG. 10, a service provider may optionally queue requests for the plurality of service types in a single queue and execute the queued requests sequentially. In an alternative exemplary embodiment of the present invention, the service provider may optionally queue requests for the plurality of service types in a separate queue for each of the plurality of service types. In this alternative embodiment, the service provider may place each request for service of a predetermined service type into a queue allocated to that predetermined service type so that the queued requests are executed in an order scheduled by the service provider. If the requests for service allocated to separate queues are executed in parallel, competition for resources such as a database lock may impact their overall execution time. The service provider may optionally restrict or prioritize requests for service of predetermined types.

If there are two workflows such that each task in the workflow invokes a particular service type, then prior art aggregates the workflows into a single function graph, resulting in a simplified form shown that combines the possible steps. In an embodiment, the present invention does not do this aggregation to reduce the complexity space. An embodiment of the present invention may consider unique combinations of {workflow, service type} and map these to a service provider. Thus, the present invention may map to a different provider than mapping done by prior art. The present invention allows for flexible scheduling and potentially better or reduced turnaround time.

EXAMPLES

A scheduling method 200 based on a genetic search method was compared against (a) a round-robin method well-known in the art that assigns each business process in a circular manner to the plurality of service providers providing each service type; (b) a random-proportional method that may proportionally assign business processes to the plurality of service providers, and (c) a greedy method that assigns all business processes to a single service provider. For a predetermined service type, the plurality of service providers are ranked by the completion time according to their SLA, and business processes are assigned in a proportional manner to the plurality of service providers based on their agreed completion time; and a greedy method that may assign business processes for each workflow to the service provider that has agreed the fastest completion time in an SLA. In the experimental simulations described below, the results were averaged over 20 trials, and each trial was started by reading in pre-initialized data from a disk. In order to provide a performance benchmark of the scheduling process 200 referenced in FIG. 2, FIG. 12 tabulates experimental parameters for providing a performance benchmark for up to about 1000 simulated workflows based on a simulator developed in the standard C++ computer language, executed under a Linux Fedora Core operating system on a desktop computer having a processor clocked at 2.5 GHz and 1 GB of random access memory.

Figure 13:
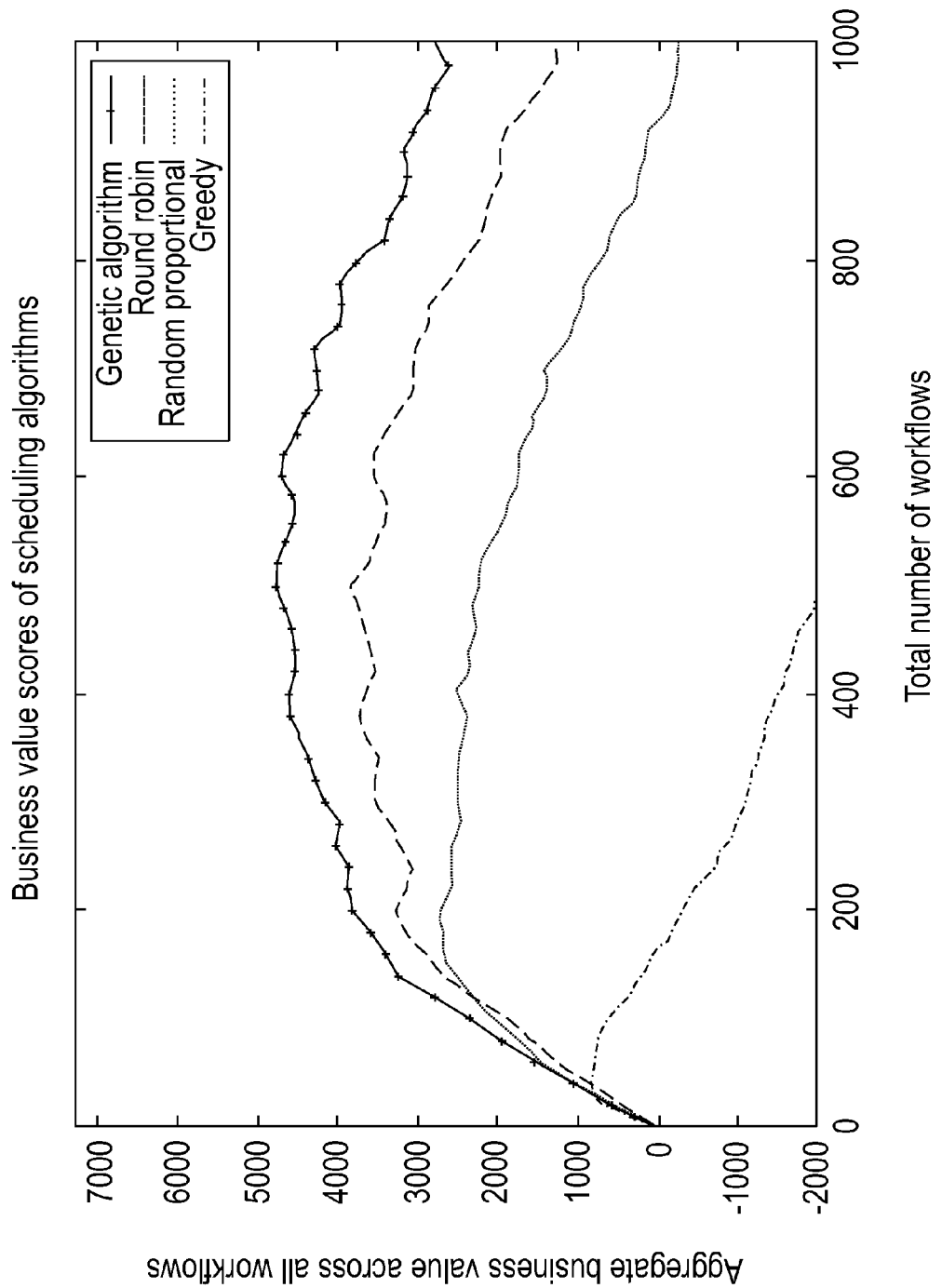
FIG. 13 is a graph that shows exemplary net business value scores resulting from a plurality of methods of scheduling in accordance with an embodiment of the present invention.

FIG. 13 is a graph that shows exemplary net business value scores resulting from exemplary genetic, round-robin, random-proportional and greedy methods of scheduling. The horizontal axis indicates the number of workflows scaled up to 1000, and the vertical axis shows the aggregate business value across all workflows. According to FIG. 8, these simulations show that the scheduling process 200 with search method 206 based on the genetic method 206 referenced in FIG. 25 with the step of adaptively increasing mutation rate 414 may consistently produce the largest aggregate net business value across all the workflows that may be related to a request for service from a specific business process. In this experiment, at 1000 workflows, the genetic method may produce about 115% improvement over the next best alternative. The greedy method may perform poorly because it does a poor job at balancing the workload: all business processes for a predetermined service type are assigned to the service provider having the fastest agreed completion time, as more requests from business processes arrive, the service provider's completion time may degrade in a linear manner. The random-proportional method may outperform the round-robin method up to about 120 workflows, but the round-robin method may eventually produce consistently higher net business values than the random-proportional method as the number of workflows increases. Although the random-proportional method may assign business processes to service providers proportionally according to their agreed completion times, each service provider may reach a real-world maximum concurrency. The round-robin method may be able to balance the workload better than the random-proportional method as the number of workflows increases.

Figure 14:
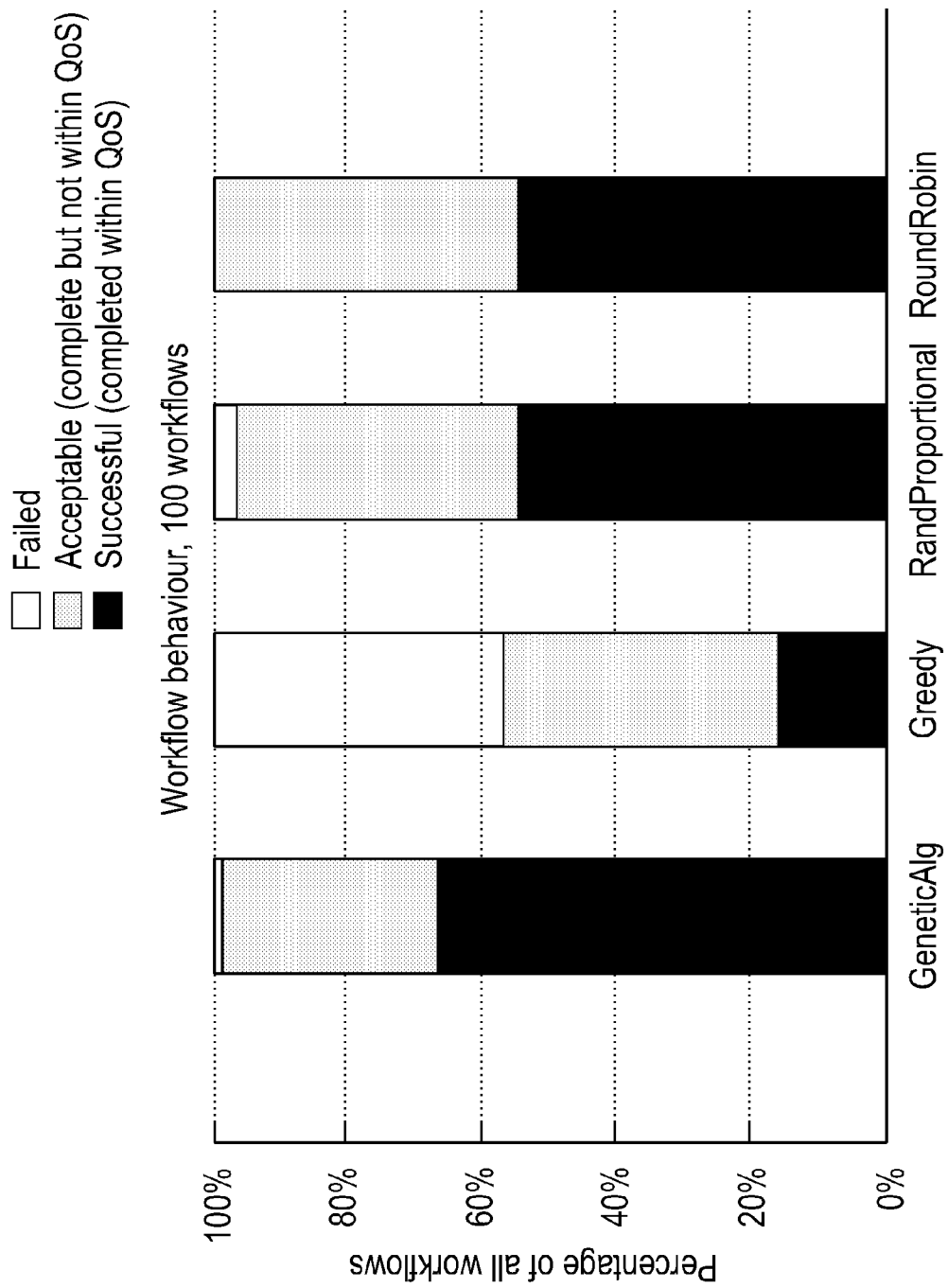
FIG. 14 is a histogram showing an exemplary workflow behavior for 100 workflows, in accordance with an embodiment of the present invention.
Figure 15:
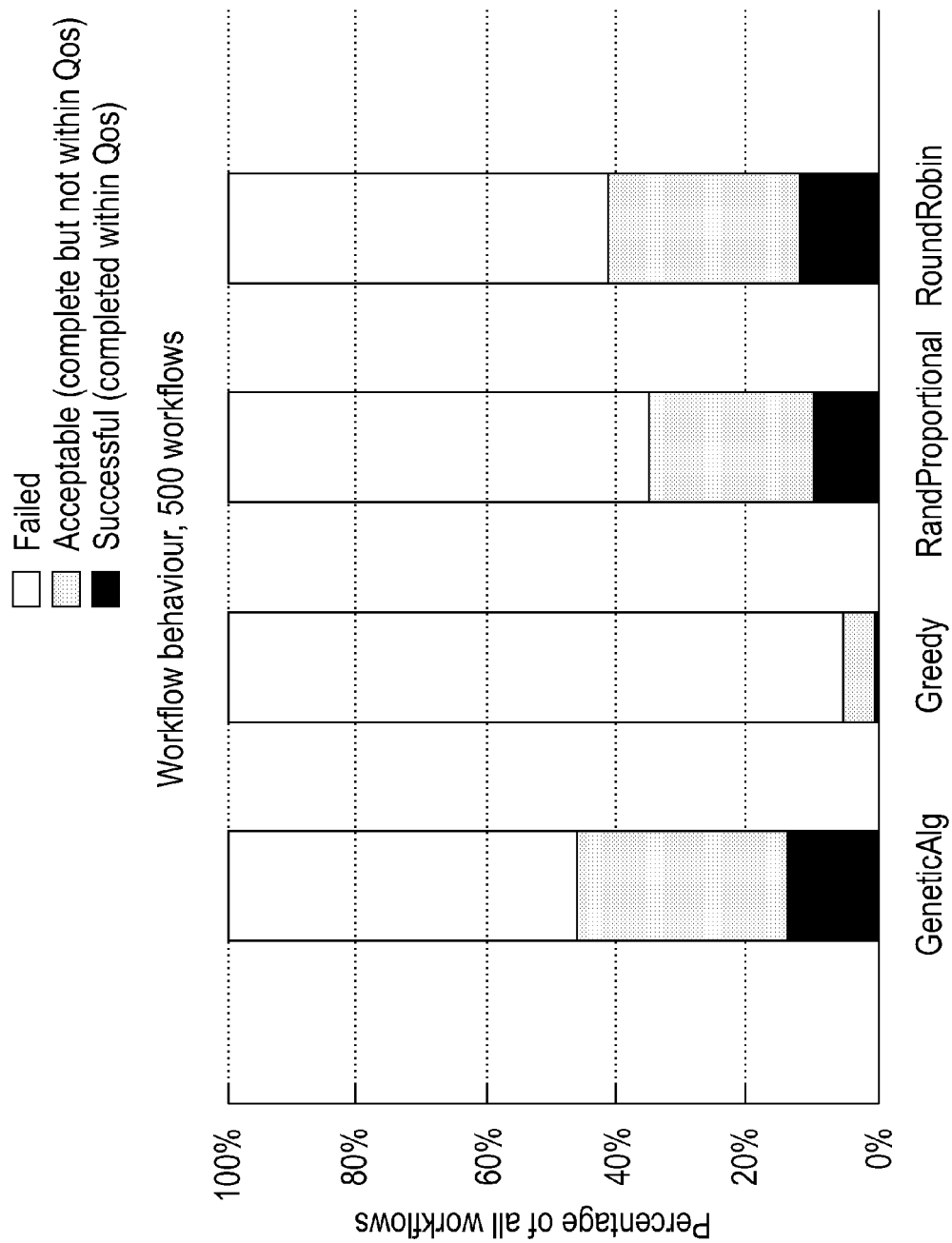
FIG. 15 is a histogram showing an exemplary workflow behavior for 500 workflows, in accordance with an embodiment of the present invention.
Figure 16:
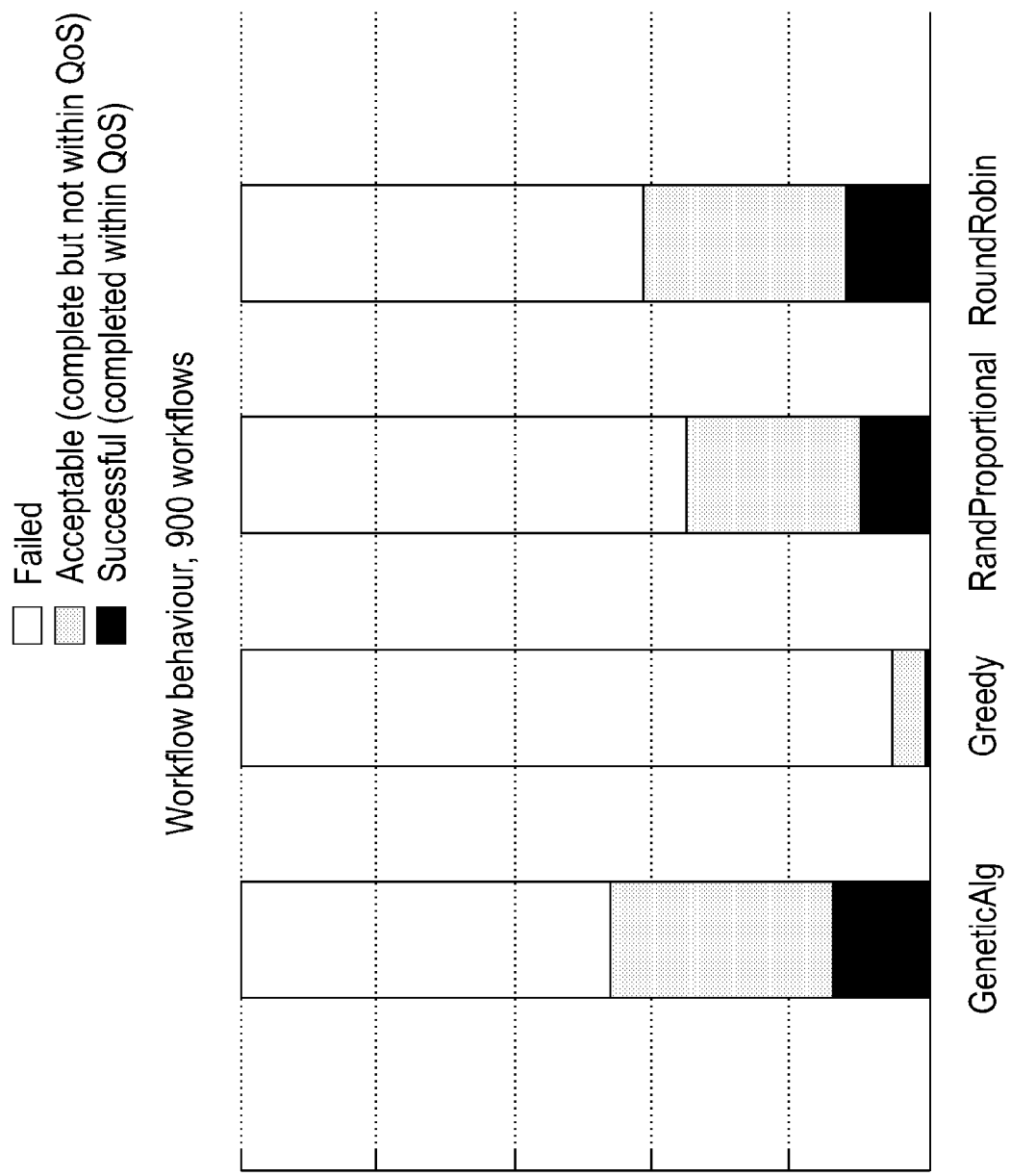
FIG. 16 is a histogram showing an exemplary workflow behavior for 900 workflows, in accordance with an embodiment of the present invention.

FIGS. 14, 15, and 16 depict histograms showing exemplary workflow behavior for 100, 500, and 900 workflows respectively. In this experiment, the genetic method 206 with the step of adaptively increasing mutation rate 411 may produce the highest percentage of successful workflows, resulting in the highest business values for the aggregate set of workflows. The round-robin method may produce a higher percentage of successful workflows than the random-proportional method but not as high a percentage of successful workflows as the genetic method.

Figure 17:
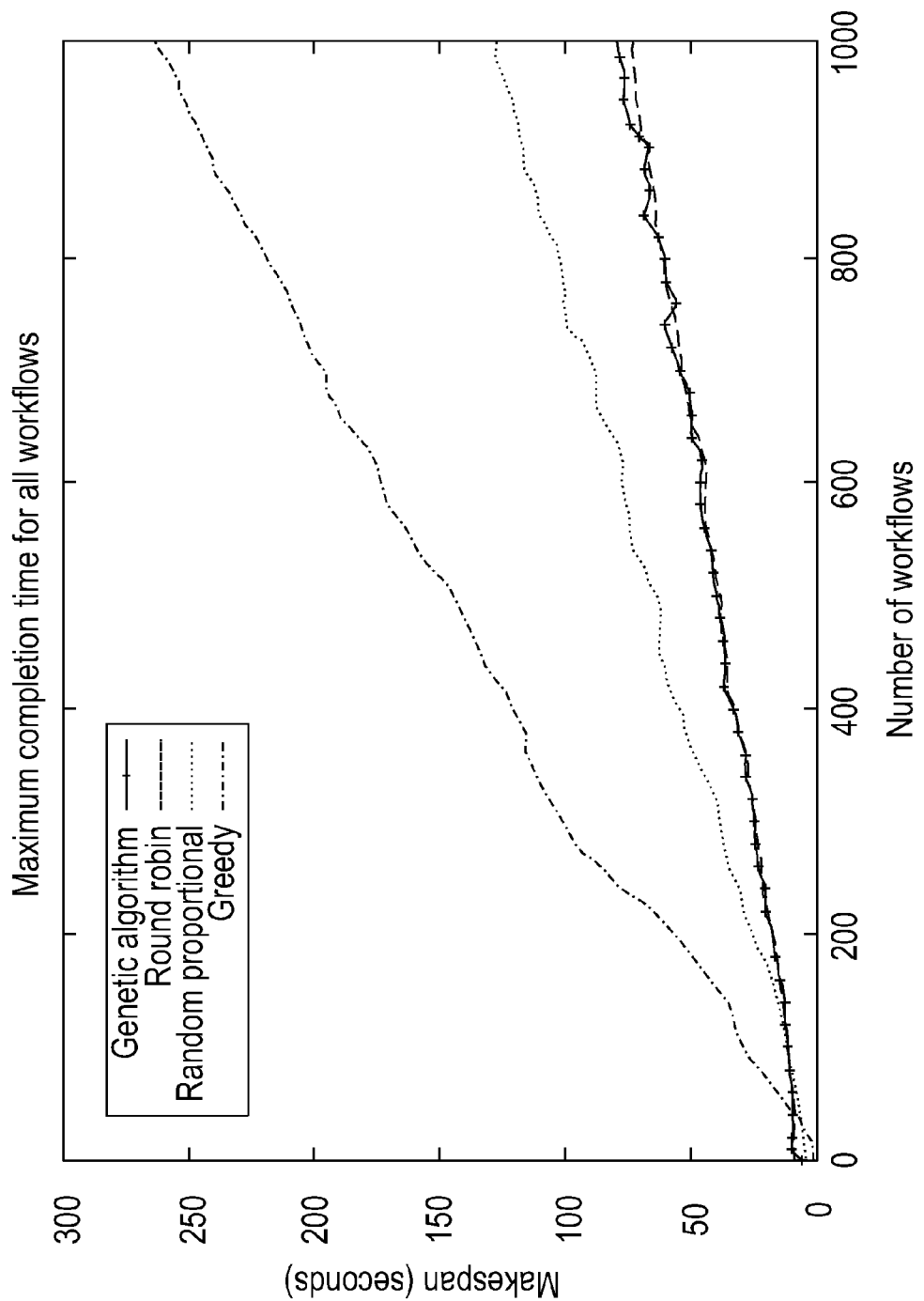
FIG. 17 is a graph showing an exemplary maximum completion time for all workflows related to a business process, resulting from several methods of scheduling, in accordance with an embodiment of the present invention.

FIG. 17 is a graph showing an exemplary maximum completion time for all workflows related to a business process, In these experiments, the genetic method 206 with the step of adaptively increasing mutation rate 414 provides the fastest maximum completion time, but the round-robin method provides about the same maximum completion time as the genetic method. A maximum completion time metric ("makespan") does not capture the net business value information and also does not capture a plurality of categories of business process completion (e.g., "successful", "acceptable", and "failed"). The genetic method may produce higher business values because it may search the solution space to find assignments of business process that produce a higher percentage of successful workflows, according to FIGS. 14-16.

Figure 18:
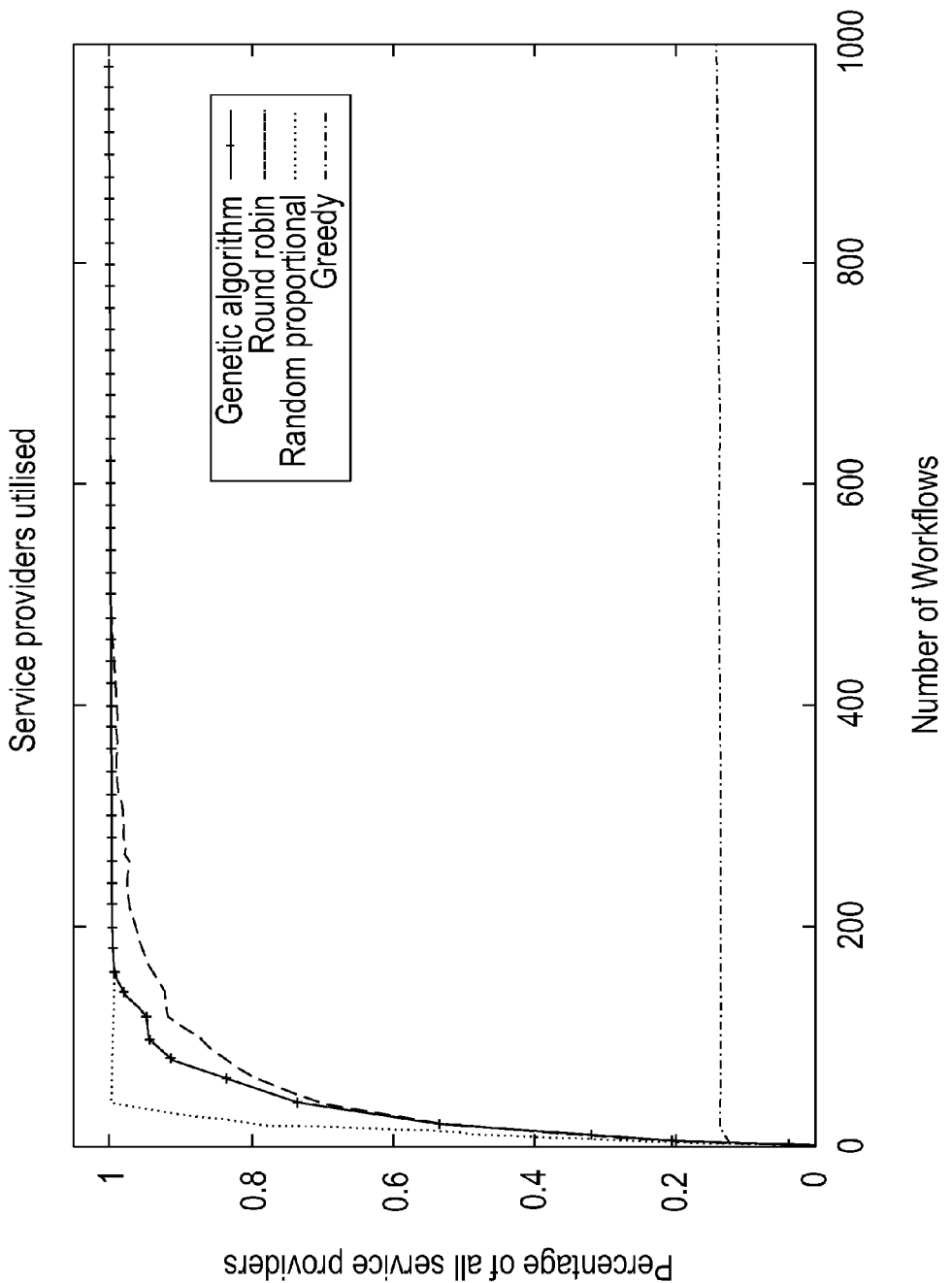
FIG. 18 is a graph showing an exemplary percentage of web service providers utilized for all workflows related to a business process, resulting from several methods of scheduling, in accordance with an embodiment of the present invention.

FIG. 18 is a graph showing an exemplary percentage of web service providers utilized for all workflows related to a business process among all the web service providers utilized in these experiments according to FIG. 16. As expected, the greedy method may always assign business processes to one service provider. In these experiments, the round-robin method may spread business process in the most rapid manner.

Figure 19:
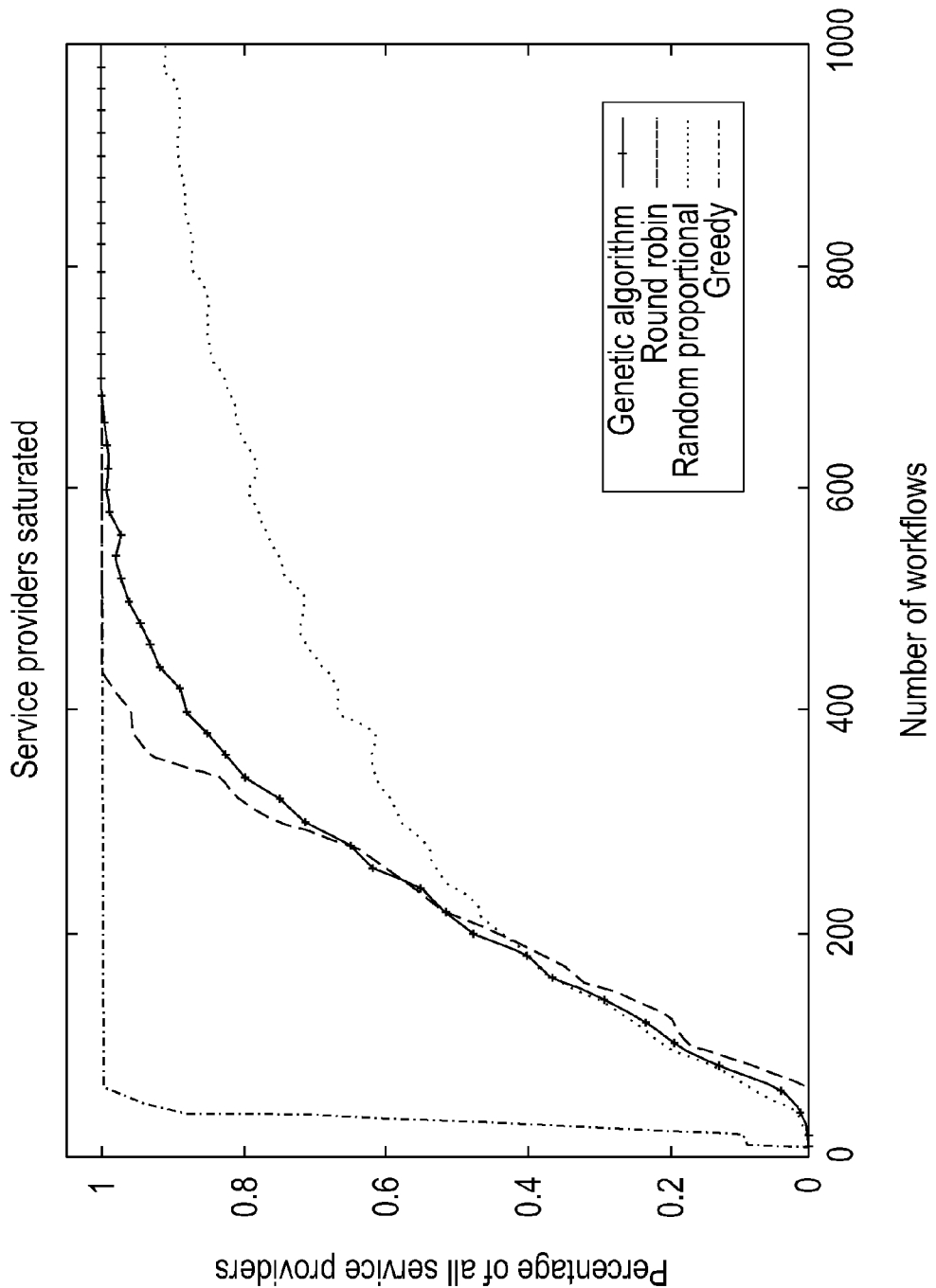
FIG. 19 is a graph showing an exemplary percentage of web service providers whose service became saturated during workflow execution, among all the web service providers utilized, in accordance with an embodiment of the present invention.

FIG. 19 is a graph showing an exemplary percentage of web service providers whose service became saturated during workflow execution, among all the web service providers utilized according to FIG. 16. In these experiments, the greedy method may assign business processes to only one service provider who may be assigned more business processes than the maximum concurrency agreed in a SLA. The random-proportional method proportionally assigns more business processes to service providers who more rapidly complete execution, a plurality of service providers may be assigned more business processes than the maximum concurrency agreed in a SLA.

Figure 20:
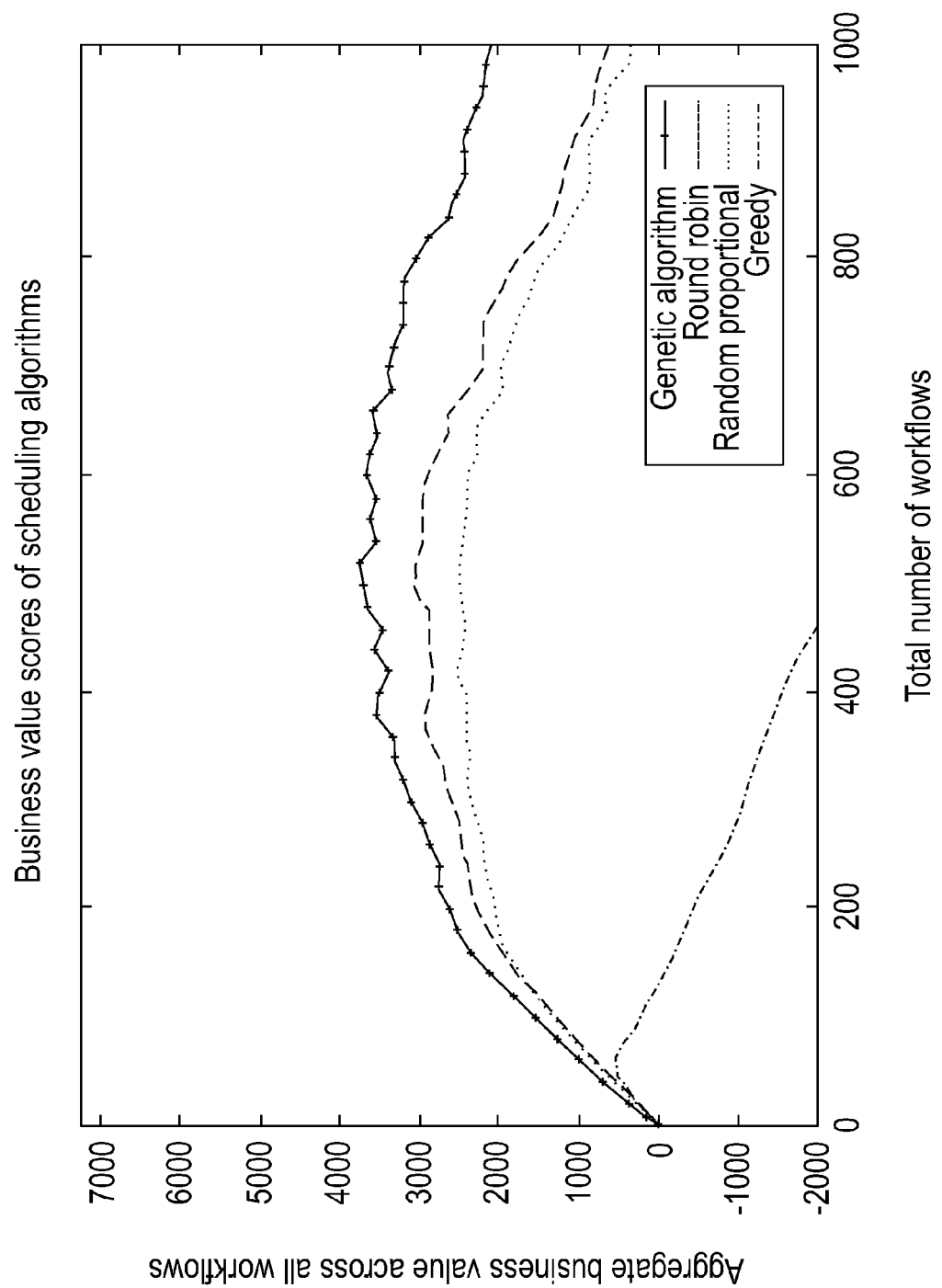
FIG. 20 is a graph showing exemplary business values for a skewed distribution of web service providers' completion time, in accordance with an embodiment of the present invention.

FIG. 20 is a graph showing exemplary business values for a skewed distribution of web service providers' completion time. In these experiments, the average completion time was drawn from a Gaussian statistical distribution with a mean value of 3.0 seconds, to simulate a larger skew than the uniform distribution used for experiments according to FIG. 13. In these experiments, the relative performance of the four methods is about the same as in FIG. 8, although the absolute business values are increased by comparison with the absolute business values according to FIG. 13.

Figure 21:
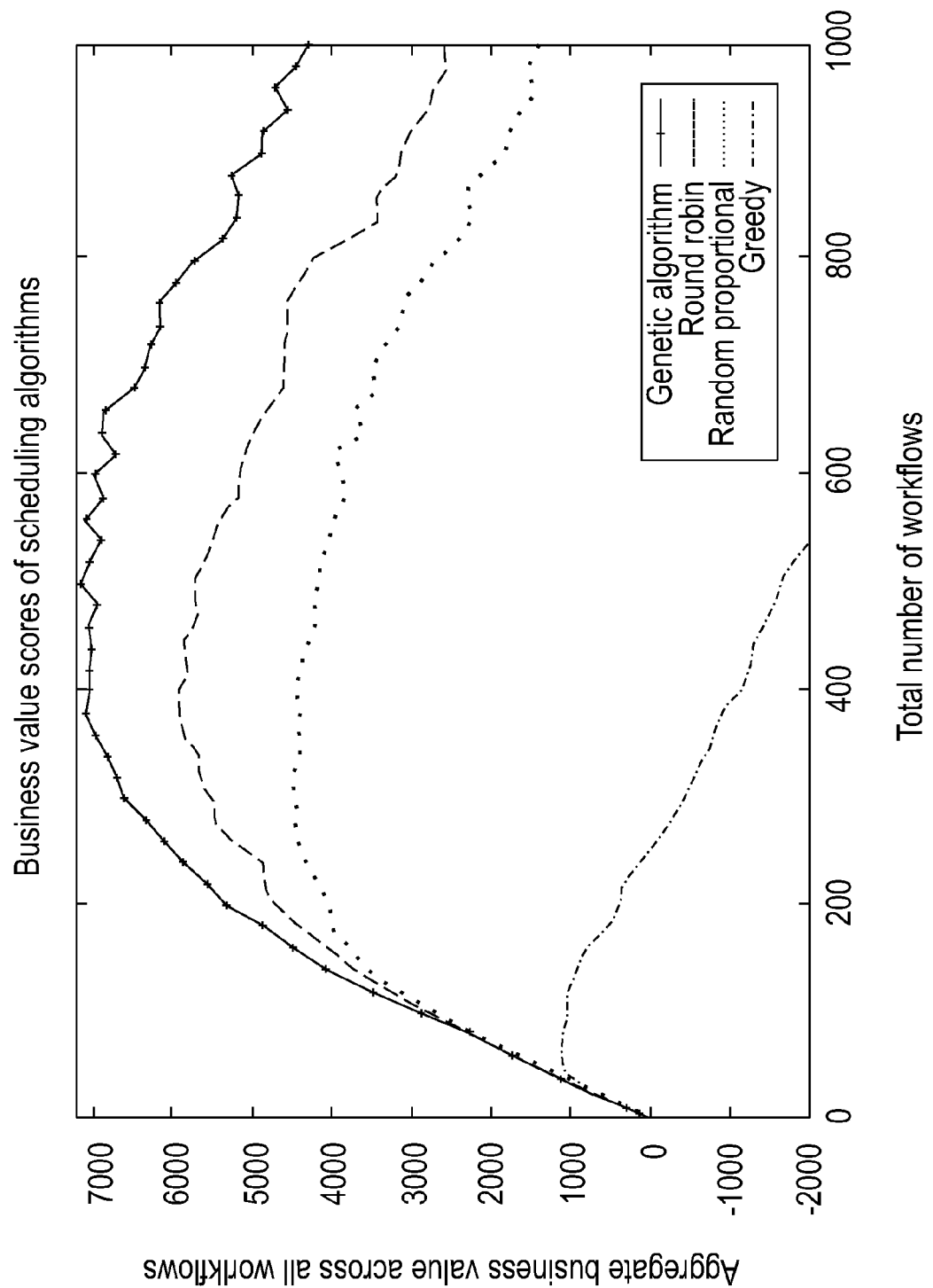
FIG. 21 is a graph showing exemplary business values for a further skewed distribution of web service providers' completion time, in accordance with an embodiment of the present invention.

FIG. 21 is a graph showing exemplary business values for a further skewed distribution of web service providers' completion time. In these experiments, the average completion time was drawn from a Gaussian statistical distribution with a mean value of 9.0 seconds, to simulate a larger skew than the uniform distribution used for experiments according to FIG. 20. FIG. 21 shows that the slower service provider may produce lower net business values than the faster service providers.

Figure 22:
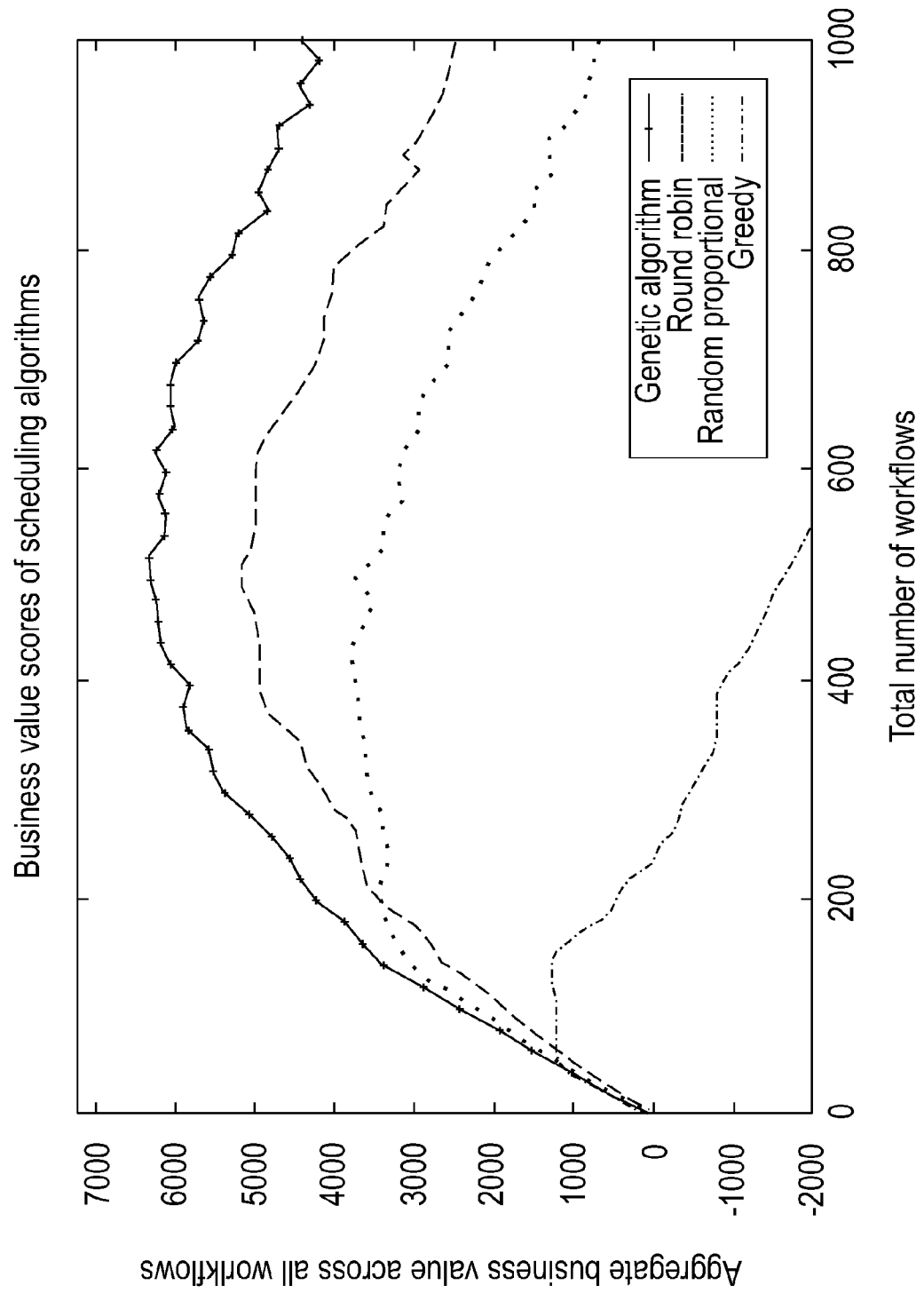
FIG. 22 is a graph showing exemplary business values for a skewed distribution of web service providers' maximum concurrency, in accordance with an embodiment of the present invention.
Figure 23:
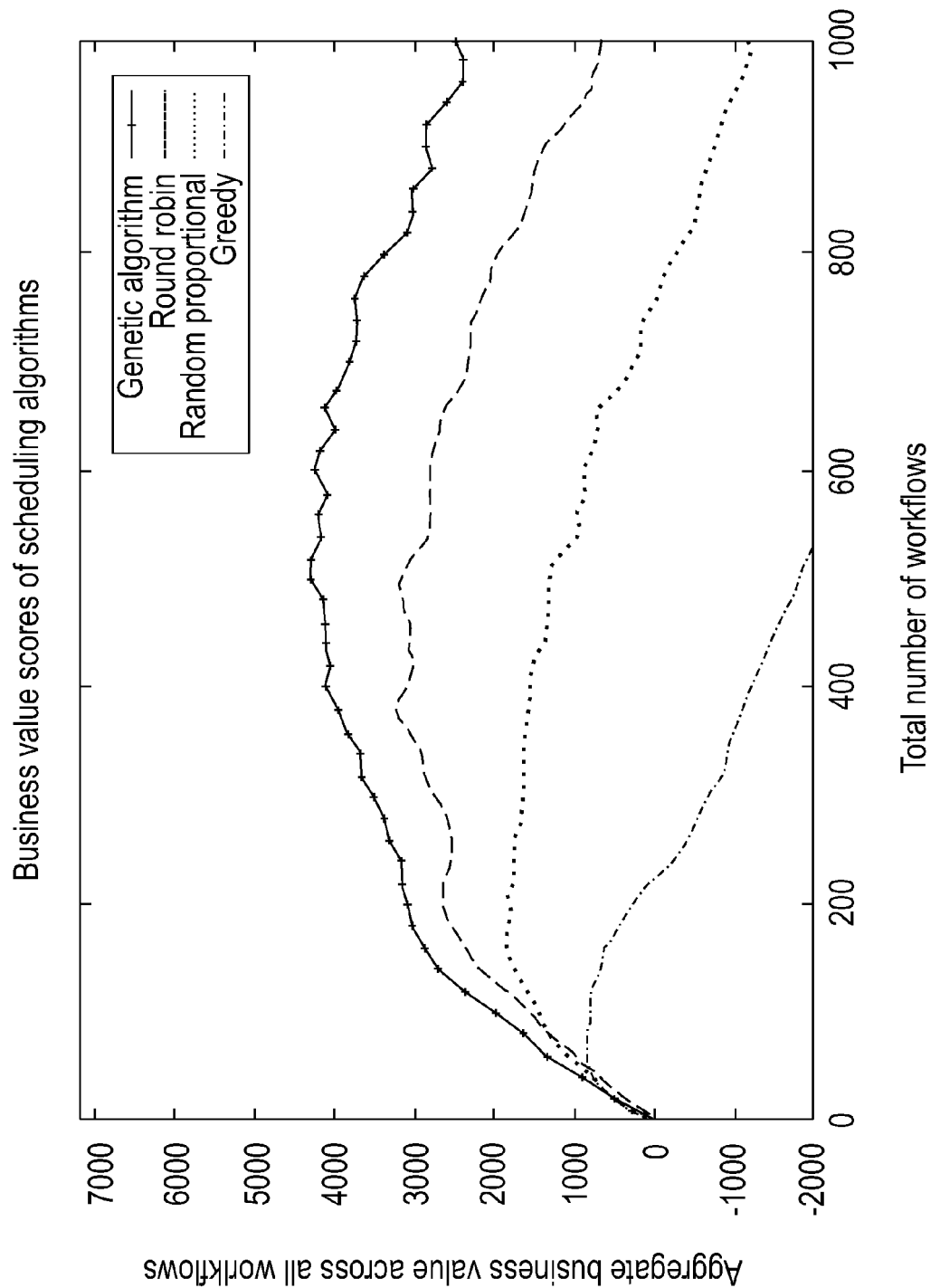
FIG. 23 is a graph showing exemplary business values for a further skewed distribution of web service providers' maximum concurrency, in accordance with an embodiment of the present invention.

FIGS. 22 and 23 show graphs illustrating exemplary business values for a skewed and a further skewed distribution of web service providers' maximum concurrency, respectively. As expected, a higher maximum concurrency may allow more workflows to complete with their QoS limit, resulting in higher business values.

Figure 24:
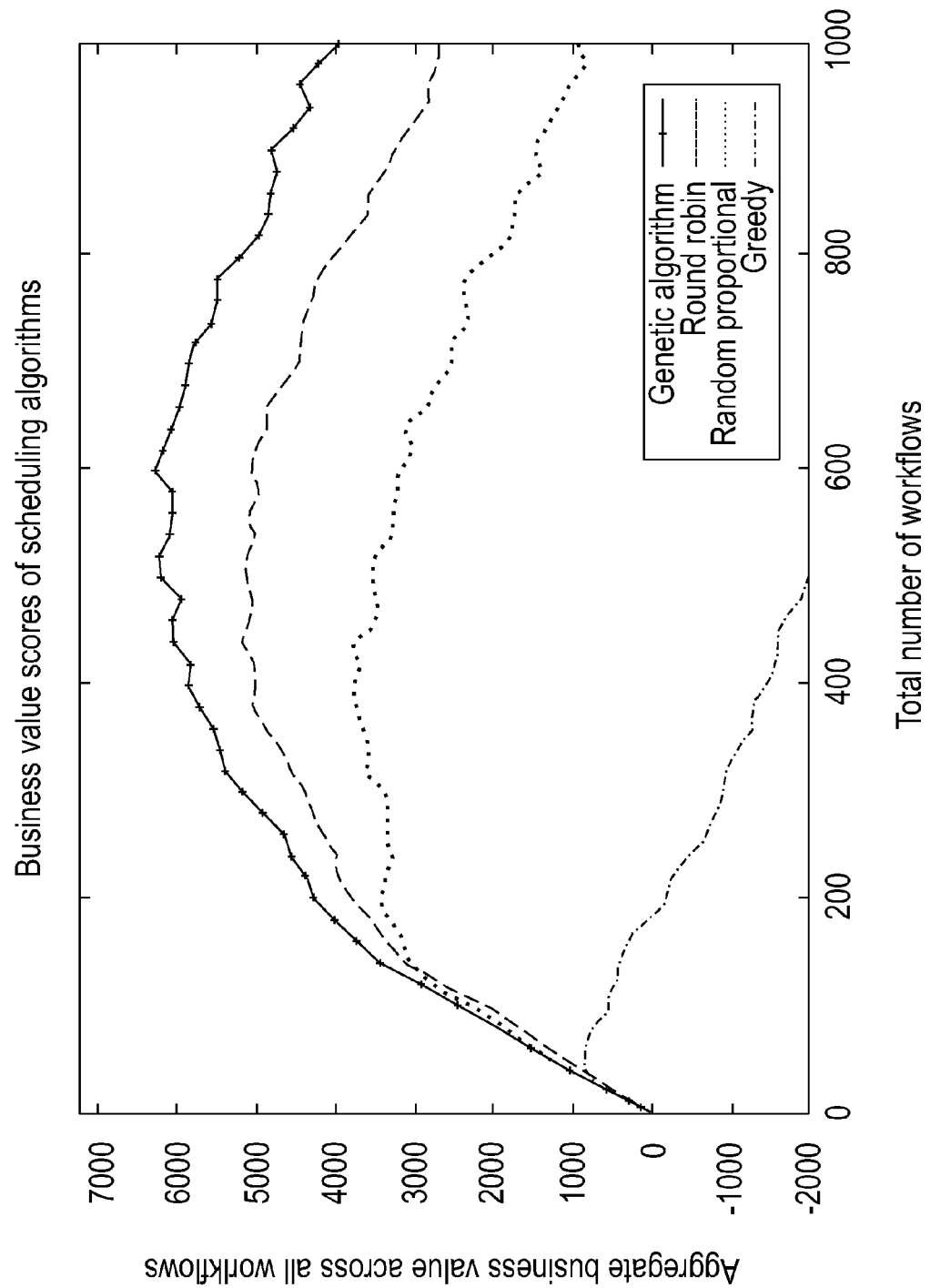
FIG. 24 is a graph showing exemplary business values for a skewed distribution of web service providers per service type, in accordance with an embodiment of the present invention.
Figure 25:
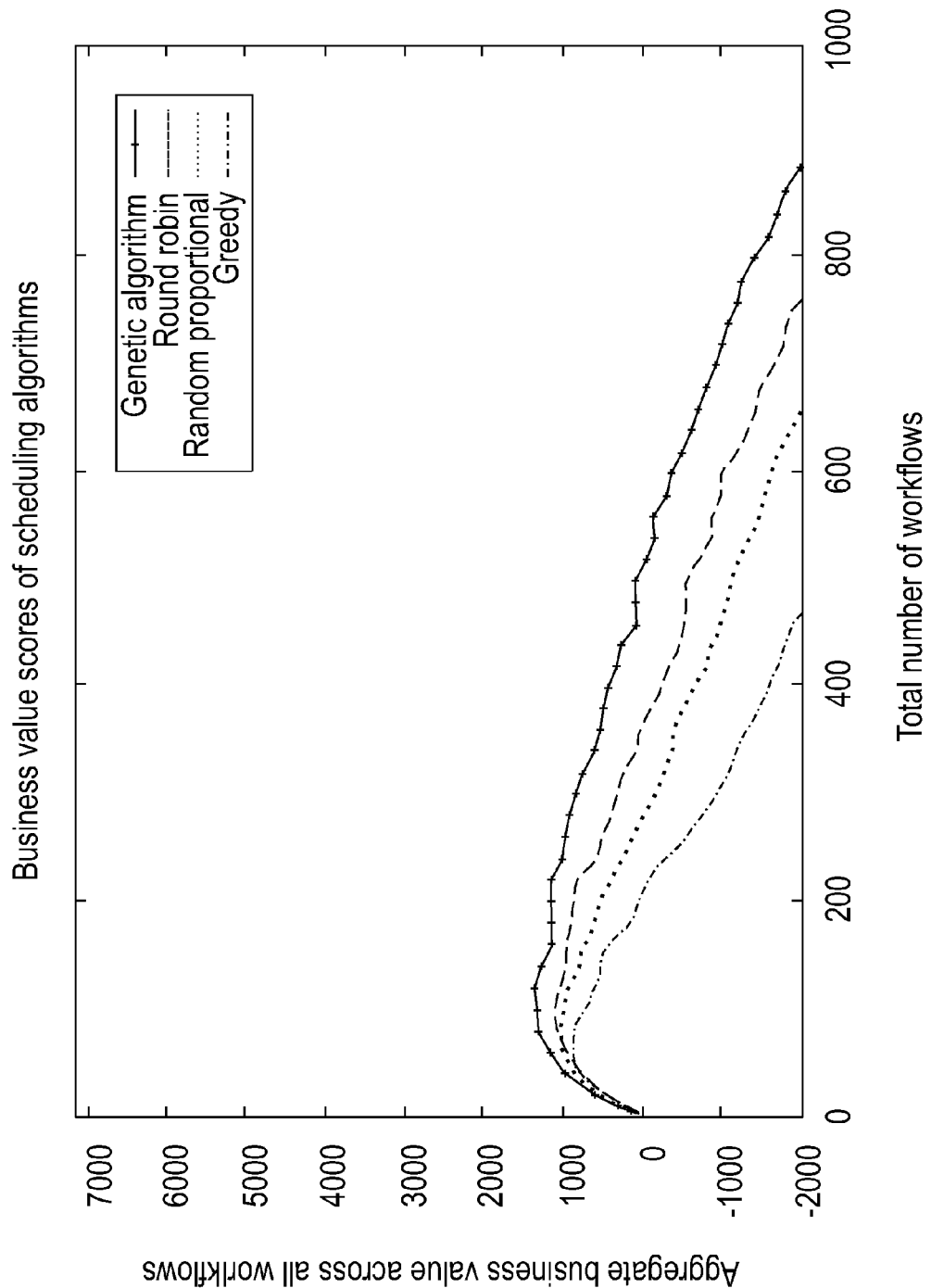
FIG. 25 is a graph showing exemplary business values for a further skewed distribution of web service providers per service type, in accordance with an embodiment of the present invention.

FIGS. 24 and 25 show graphs illustrating exemplary business values for a skewed and a further skewed distribution of web service providers per service type, respectively. In these experiments, increasing the number of service providers per service type may result in higher business values since few service providers may be assigned more business processes than the maximum concurrency agreed in a SLA 710.

Figure 26:
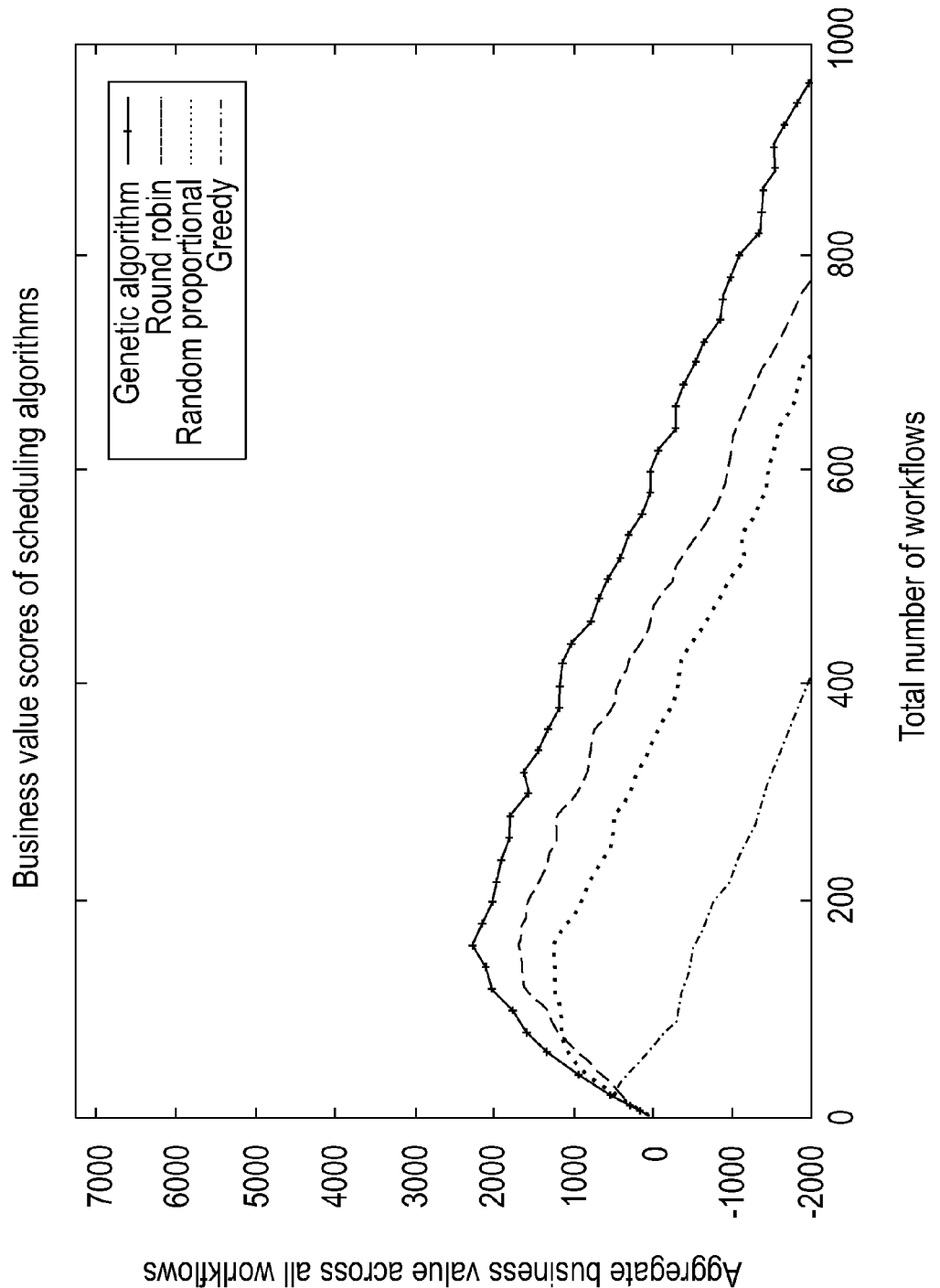
FIG. 26 is a graph showing exemplary business values for a further skewed distribution of business processes per workflow, in accordance with an embodiment of the present invention.
Figure 27:
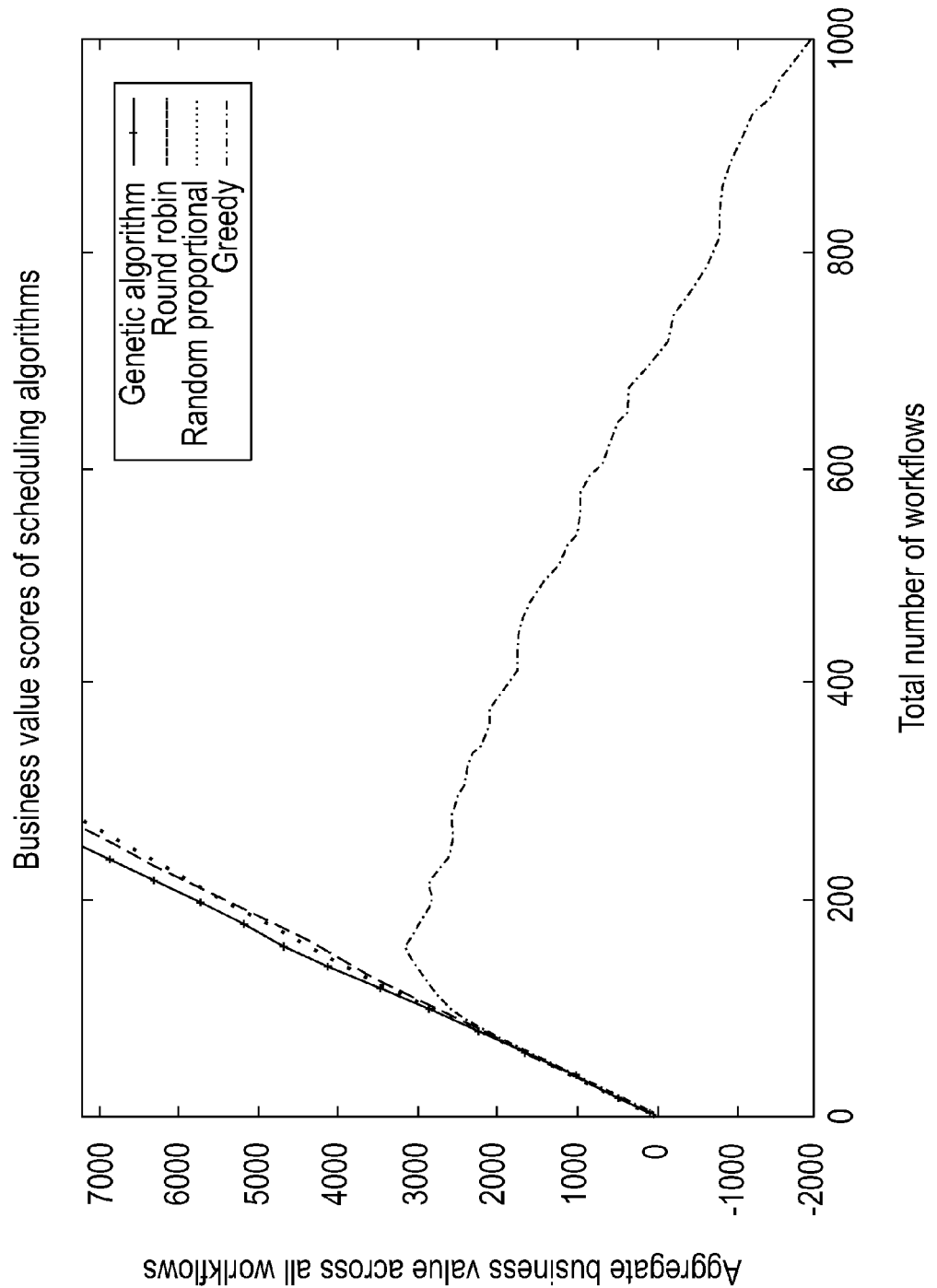
FIG. 27 is a graph showing exemplary business values for a further skewed distribution of business processes per workflow, in accordance with an embodiment of the present invention.

FIGS. 26 and 27 show graphs illustrating showing exemplary business values for a skewed and a further skewed distribution of web service providers per service type, respectively. In these experiments, FIG. 26 results from a strong skew towards increasing the number of business processes per workflow. FIG. 27 results from a strong skew towards decreasing the number of business processes per workflow, which may result in increasing aggregate business values since more workflows complete within the QoS limit agreed in a SLA 710.

Figure 28:
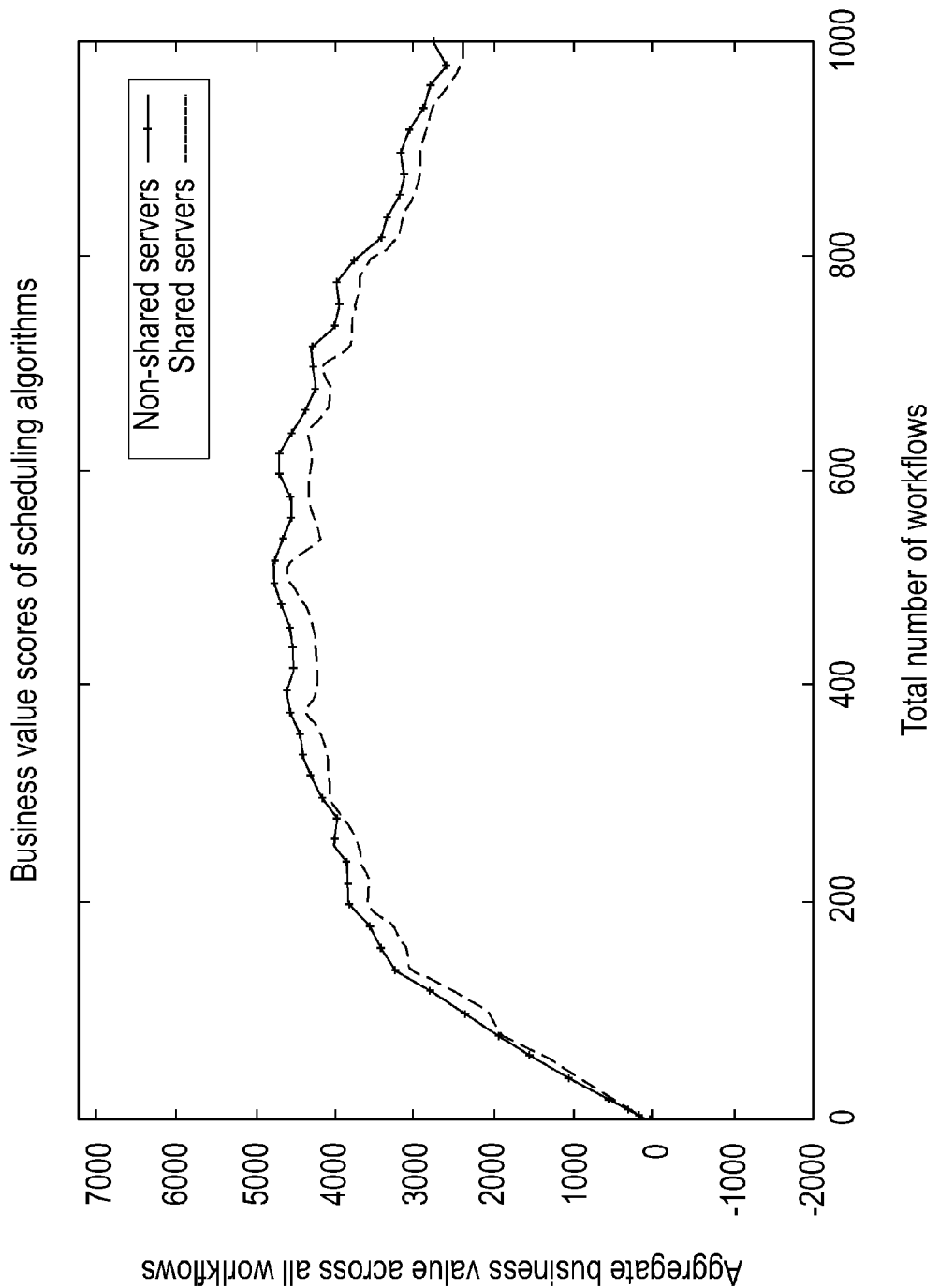
FIG. 28 is a graph showing exemplary business values for non-shared and shared servers, in accordance with an embodiment of the present invention.

In an exemplary embodiment of the present invention, a server maintains a queue for a plurality of service providers. FIG. 28 is a graph showing exemplary business values for non-shared and shared servers, based on a genetic method 206 with the step of adaptively increasing mutation rate 414.

In the experiments reported in FIGS. 7-23, the running time of the genetic method 206 with the step of adaptively increasing mutation rate 414 increases about linearly with increasing number of workflow and was about 25 seconds for about 1000 workflows. The round-robin, random-proportional, and greedy methods had running time in less than about 1 second, for up to about 1000 workflows.

It should be understood, of course, that the foregoing relates to exemplary embodiments of the invention and that modifications may be made without departing from the spirit and scope of the invention as set forth in the following claims. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A computer-implemented method of assigning a web service request to a plurality of service providers comprising:
sending a web service request from a requesting computer to a first network;
sending the web service request from the first network to a network server;
sending the web service request from the network server to an application server;
performing by a computer processor on the application server:
decomposing, by the computer processor, a web service request received by the application server from the first network into a plurality of workflows;
analyzing, by the computer processor, the plurality of workflows using a computer to determine a plurality of business processes;
associating, by the computer processor, a plurality of web service types with each of the plurality of business processes, wherein the web service types describe one of the plurality of web service providers;
assigning, by the computer processor, a business value including average completion time of one of the business processes to each of the plurality of business processes;
evaluating, by the computer processor, the plurality of web service types with respect to the business value of each of the plurality of business processes;
maximizing, by the computer processor, the business value for one of the plurality of business processes by selecting one of the plurality of business processes;
creating, by the computer processor, an aggregated business process by combining partially completed ones of the plurality of business processes with an unstarted one of the plurality of business processes;
queueing, by the computer processor, the plurality of business processes for execution, in response to the queueing, searching for an assignment of said plurality of business processes and the aggregated business process to said plurality of service providers based on a minimum completion time for executing the web service request across all service providers, wherein the searching further comprises solving a combinatorial optimization problem utilizing a genetic search algorithm comprising:
  selecting initial chromosomes, wherein a chromosome is an assignment of one of the plurality of business processes to one of the plurality of service providers;
  mutating the selected chromosomes responsive to a mutation rate, wherein the selected chromosomes mutate only when a random number generator provides a non-negative integer that is less than or equal to a current number of the plurality of workflows; and
  iteratively,
    recombining the mutated chromosomes;
    evaluating a cost for recombined chromosomes;
    selecting recombined chromosomes with a lowest value of the cost;
  until all the workflows have been evaluated;
  performing, by the computer processor, those of the plurality of workflows that are independent of each other in non-sequential order using the assigned one of said plurality of service providers;
  adjusting, by the computer processor, workload for one of the plurality of workflows among the plurality of service providers by balancing the workload for the one of the plurality of workflows on a plurality of web servers based on a maximum concurrency of the plurality of workflows, wherein for workloads that exceed the maximum concurrency, an expected average completion time for the workload varies with expected completion time, workload size, and average performance under workload;
  categorizing, by the computer processor, a first one of the plurality of workflows as a success when a completion time of the one of the plurality of workflows is less than a predetermined quality value; and
  categorizing, by the computer processor, a second one of the plurality of workflows as a failure when the completion time of the one of the plurality of workflows is greater than a constant times the predetermined quality value, and
  outputting, by the computer processor, the plurality of business processes to a second network.

2. The method of claim 1, wherein at least one of said service providers provides more than one web service type.

3. The method of claim 1, wherein at least one of said service providers offers a plurality of tiers of service.

4. The method of claim 1, wherein the plurality of workflows includes non-sequential workflows.

5. The method of claim 1, wherein the searching is performed including one of: a greedy algorithm, a round-robin algorithm or a random-proportional algorithm.

6. The method of claim 1, wherein the plurality of workflows includes at least one nested workflow.

7. The method of claim 1, wherein the plurality of workflows includes at least one conditional workflow.

8. The method of claim 1, wherein the selecting of initial chromosomes is selecting at random.

9. The method of claim 1, wherein the evaluating chromosomes comprises:
  accepting a plurality of input workflows and an initial mapping of the plurality of business processes to the service providers;
  initializing variables including initializing the overall business value;
  assigning the plurality of business processes to the plurality of service providers;
  calculating completion times for the plurality of workflows; and
  iteratively,
    incrementing completion times for the plurality of workflows;
    categorizing workflow completion times for the plurality of workflows; and
    incrementing the business value for the plurality of workflows;
  until the plurality of workflows has been processed.

10. The method of claim 9, further comprising:
  increasing said mutation rate when chromosomes under evaluation fail to improve the overall business value.

11. The method of claim 9, wherein the searching is responsive to a service provider's method of queuing business processes for execution.

12. A computer program product for assigning a web service request to a plurality of service providers, the computer program product comprising:
  a non-transitory computer readable storage medium on an application server computer having computer readable program code embodied therewith, when executed by a computer processor causes the computer processor to receive computer executable instructions from a first network, and causes the computer processor to perform the steps comprising:
  decomposing a web service request into a plurality of workflows, wherein the web service request is received from a requesting computer through a first network to a network server, and from the network server to the application server computer;
  analyzing the plurality of workflows using a computer to determine a plurality of business processes;
  associating a plurality of web service types with each of the plurality of business processes, wherein the web service types describe one of the plurality of service providers;
  assigning a business value including average completion time to each of the plurality of business processes;
  evaluating the plurality of web service types with respect to the business value of each of the plurality of business processes;
  maximizing the business value for one of the plurality of business processes by selecting one of the plurality of web service types for one of the plurality of business processes;
  creating an aggregated business process by combining partially completed ones of the plurality of business processes with an unstarted one of the plurality of business processes;
  queueing the plurality of business processes for execution, in response to the queueing, searching for an assignment of said plurality of business processes and the aggregated business process to said plurality of service providers based on a minimum completion time for executing the web service request across all of the plurality of service providers, wherein the searching further comprises solving a combinatorial optimization problem utilizing a genetic search algorithm comprising:
  selecting initial chromosomes wherein a chromosome is an assignment of one of the plurality of business processes to one of the plurality of service providers;
  mutating the selected chromosomes responsive to a mutation rate, wherein the selected chromosomes mutate only when a random number generator provides a non-negative integer that is less than or equal to a current number of the plurality of workflows; and iteratively,
recombining the mutated chromosomes;
evaluating a cost for the recombined chromosomes;
selecting recombined chromosomes with lowest value of the cost;
until all the workflows have been evaluated;
performing the plurality of workflows that are independent of each other in non-sequential order;
adjusting workload for one of the plurality of workflows and balancing the workload on a plurality of web servers based on a maximum concurrency of the plurality of workflows, wherein for workloads that exceed the maximum concurrency of the plurality of workflows, an expected average completion time for the workload varies with expected completion time, workload size, and average performance under workload;
categorizing a first one of the plurality of workflows as a success when a completion time of the one of the plurality of workflows is less than a predetermined quality value; and
categorizing a second one of the plurality of workflows as a failure when the completion time of the one of the plurality of workflows is greater than a constant times the predetermined quality value,
wherein the computer processor is configured to output the plurality of business processes to a second network.

13. The computer program product of claim 12, wherein at least one of said service providers provides more than one web service type.

14. The computer program product of claim 12, wherein at least one of said service providers offers a plurality of tiers of service.

15. The computer program product of claim 12, wherein the plurality of workflows includes non-sequential workflows.

16. The computer program product of claim 12, wherein the searching is performed using a genetic search algorithm.

17. The computer program product of claim 12, wherein the searching is performed using one of: a greedy algorithm, a round-robin algorithm or a random-proportional algorithm.

18. The computer program product of claim 12, wherein the plurality of workflows includes at least one conditional workflow.

19. The computer program product of claim 16, wherein the selecting of initial chromosomes is selecting at random.

20. The computer program product of claim 12, that includes:
computer readable program code configured to accept a plurality of input workflows and an initial mapping of the plurality of business processes to the service providers;
computer readable program code configured to an initialize variables including initializing the overall business value;
computer readable program code configured to assign the plurality of business processes to the plurality of service providers;
computer readable program code configured to calculate completion times for the plurality of workflows; and
iteratively,
increments completion times for the plurality of workflows;
categorizes workflow completion times for the plurality of workflows; and
increments the business value for the plurality of workflows;
until the plurality of workflows has been processed.

21. The computer program product of claim 12, further comprising:
computer readable program code configured to increase said mutation rate when chromosomes under evaluation fail to improve the overall business value.

22. The computer program product of claim 12, wherein the searching is responsive to a service provider's method of queuing business processes for execution.

23. An electronic commerce system comprising:
a requesting computer configured to send a web service request with respect to a web service through a first network to a network server computer;
an application server computer configured to support the web service;
the network server computer configured to output computer executable instructions from the first network to the application server computer;
a memory device configured to store the computer executable instructions, that when stored on the application server computer and executed by the application server computer, the computer executable instructions comprise:
a decomposition module that is configured to decompose a web service request into a plurality of workflows;
an analysis module that is configured to analyze the plurality of workflows using a computer to determine a plurality of business processes;
an association module that is configured to associate a plurality of web service types with each of the plurality of business processes;
an assignment module that is configured to assign a business value including average completion time to each of the plurality of business processes;
an evaluation module configured to select one of the plurality of web service types for each of the plurality of business processes, and maximize the business value for one of the plurality of business processes by selecting one of the plurality of web service types for one of the plurality of business processes;
an aggregation module configured to create an aggregated business process by combining partially completed ones of the plurality of business processes with an unstarted one of the plurality of business processes;
a search module that is configured to queue the plurality of business processes for execution, in response to the queue, searching for an assignment of said plurality of business processes and the aggregated business process to a plurality of service providers based on a minimum completion time executing the web service request across all the plurality of service providers, wherein the searching further includes solving a combinatorial optimization problem utilizing a genetic search algorithm comprising:
selecting initial chromosomes, wherein a chromosome is an assignment of one of the plurality of business processes to one of the plurality of service providers;
mutating the selected chromosomes responsive to a mutation rate, wherein the selected chromosomes mutate only when a random number generator provides a non-negative integer that is less than or equal to a current number of the plurality of workflows; and iteratively,
recombining the mutated chromosomes;
evaluating a cost for the recombined chromosomes;
selecting recombined chromosomes with lowest value of the cost;
until all the workflows have been evaluated;
a performance module that is configured to perform the plurality of workflows that are independent of each other in non-sequential order, wherein the performance module performs workload balancing by performing the plurality of workflows among a plurality of web servers in a balanced manner;
an adjustment module that is configured to adjust workload for one of the plurality of workflows based on a maximum concurrency of the plurality of workflows, wherein for workloads that exceed the maximum concurrency, an expected average completion time for the workload varies with expected completion time, workload size, and average performance under workload;

a categorization module that is configured to categorize a first one of the plurality of workflows as a success when a completion time of the one of the plurality of workflows is less than a predetermined quality value; and
the categorization module further is configured to categorize a second one of the plurality of workflows as a failure when the completion time of the one of the plurality of workflows is greater than a constant times the predetermined quality value,
wherein the performance module outputs the plurality of business processes for execution on a second network.

24. The electronic system of claim 23, wherein at least one of said plurality of service providers provides more than one web service type.

25. The electronic system of claim 23, wherein at least one of said plurality of service providers offers a plurality of tiers of service, wherein decreasing a number of business processes for each of the plurality of workflows results in an increased aggregate business value.

* * * * *